United States Patent
Klabunde et al.

(10) Patent No.: US 10,052,695 B2
(45) Date of Patent: Aug. 21, 2018

(54) POWER TOOL

(71) Applicants: C. & E. FEIN GMBH, Schwäbisch Gmünd-Bargau (DE); ROBERT BOSCH GMBH, Stuttgart (DE)

(72) Inventors: Olaf Klabunde, Giengen/Brenz (DE); Juergen Blickle, Goeppingen (DE); Walter Thomaschewski, Filderstadt (DE); Fabian Bek, Boebingen (DE); Stefano Delfini, Bettlach (CH); Willi Fellmann, Solothurn (CH); Bruno Luescher, Zolfingen (CH); Milan Bozic, Solothurn (CH); Thomas Mathys, Lyss (CH); Daniel Grolimund, Zuchwil (CH)

(73) Assignees: C. & E. FEIN GMBH, Gmuend-Bargau (DE); ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/909,233

(22) PCT Filed: Jul. 25, 2014

(86) PCT No.: PCT/EP2014/002049
§ 371 (c)(1),
(2) Date: Feb. 1, 2016

(87) PCT Pub. No.: WO2015/014468
PCT Pub. Date: Feb. 5, 2015

(65) Prior Publication Data
US 2016/0199919 A1 Jul. 14, 2016

(30) Foreign Application Priority Data

Aug. 1, 2013 (DE) .................. 20 2013 006 900

(51) Int. Cl.
*B23B 31/10* (2006.01)
*B24B 45/00* (2006.01)
(Continued)

(52) U.S. Cl.
CPC ............ *B23B 31/008* (2013.01); *B23B 31/10* (2013.01); *B24B 45/006* (2013.01); *B27B 5/32* (2013.01);
(Continued)

(58) Field of Classification Search
CPC . B23B 31/10; B23B 31/008; B23B 2231/024; B23B 2231/48; B27B 19/006;
(Continued)

(56) References Cited

U.S. PATENT DOCUMENTS

| 10,924 A | 5/1854 | Daboli |
|---|---|---|
| 32,890 A | 7/1861 | Pollard |

(Continued)

FOREIGN PATENT DOCUMENTS

| CN | 1357431 | 7/2002 |
|---|---|---|
| CN | 101066577 | 11/2007 |

(Continued)

OTHER PUBLICATIONS

Official Action with English Translation for China Patent Application No. 2014800435548, dated May 2, 2017, 13 pages.
(Continued)

*Primary Examiner* — Eric A Gates
*Assistant Examiner* — Chwen-Wei Su
(74) *Attorney, Agent, or Firm* — Sheridan Ross P.C.

(57) ABSTRACT

The invention relates to a machine tool, in particular a hand held machine tool, which has a tool receiving device that is movable, in particular in an oscillating manner, around an output shaft (2). The tool receiving device is designed to hold a tool device on the machine tool in such a manner that (Continued)

Figure 1:
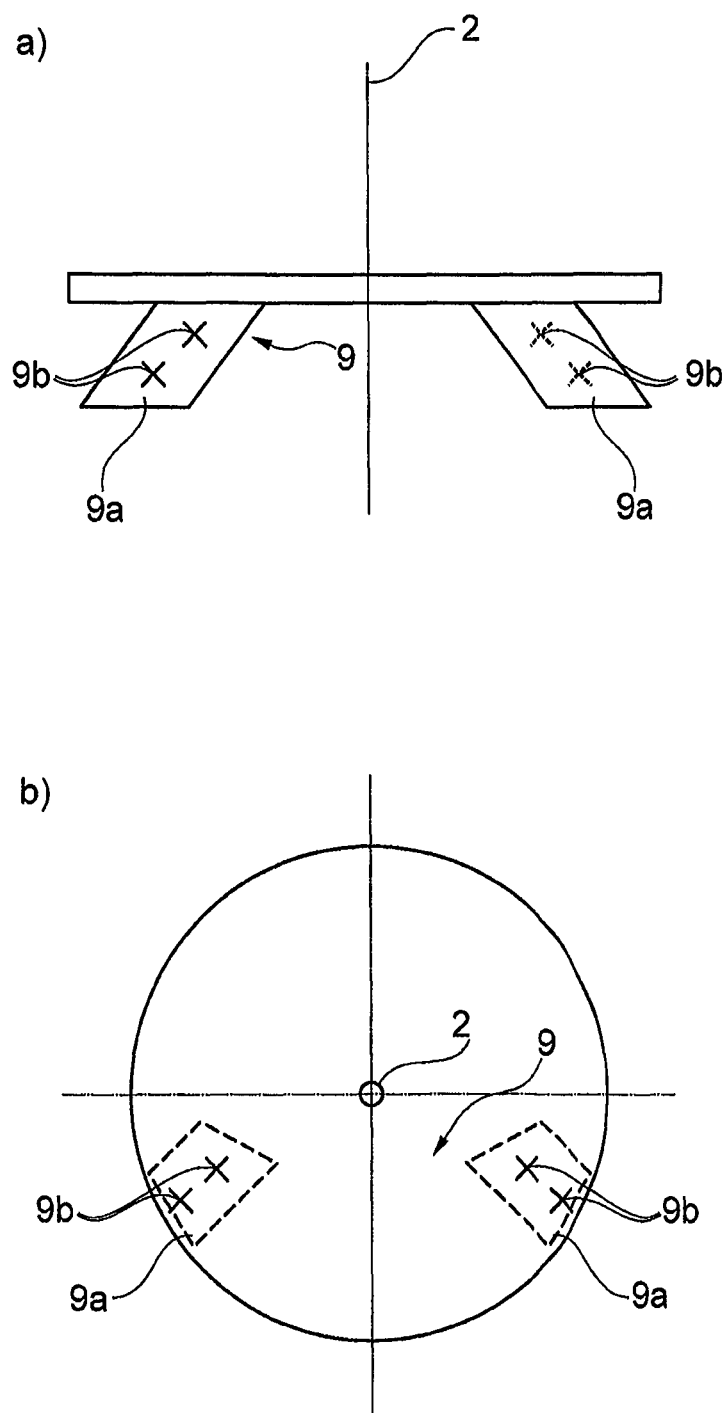

the output shaft and a tool rotation axis substantially coincide. The tool receiving device has at least one torque transmission region (9) and a holding device (4a, 4b). In order to transmit a driving force to the tool device, the torque transmission region has at least two output area regions (9a) that are arranged at a distance from said output shaft and each have a multiplicity of surface points. Here, the tangent planes to said surface points are inclined in regard to an axial plane which includes said output shaft. Furthermore, the tangent planes are inclined in regard to a radial plane which extends perpendicularly to the output shaft. In this way, the output torque is transmitted reliably to the tool device by the machine tool via the tool receiving device.

24 Claims, 16 Drawing Sheets

(51) Int. Cl.
  *B27B 5/32* (2006.01)
  *B23B 31/00* (2006.01)
(52) U.S. Cl.
  CPC ......... *B23B 2231/48* (2013.01); *Y10T 279/33* (2015.01)
(58) Field of Classification Search
  CPC .. B27B 5/30; B27B 5/32; B24B 23/02; B24B 23/04; B24B 45/006; B23D 61/006; Y10T 279/33
  See application file for complete search history.

(56) References Cited

U.S. PATENT DOCUMENTS

| | | | |
|---|---|---|---|
| 78,652 A | 6/1868 | Criag | |
| 3,233,908 A | 2/1966 | Schwartzmayr et al. | |
| 3,622,170 A | 11/1971 | Sedgwick | |
| 3,998,467 A | 12/1976 | Petkovich | |
| 4,205,572 A | 6/1980 | Weiner | |
| 4,747,607 A | 5/1988 | Emter | |
| 5,031,361 A | 7/1991 | MacKay, Jr. | |
| 5,157,873 A * | 10/1992 | Rudolf | B24B 23/022 279/904 |
| 5,468,176 A * | 11/1995 | Udert | B23D 45/165 451/342 |
| 6,142,858 A * | 11/2000 | Luedeke | B24B 45/006 451/342 |
| 6,623,202 B2 * | 9/2003 | Hansson | B23B 31/008 403/257 |
| 6,796,888 B2 | 9/2004 | Jasch | |
| 6,887,142 B2 | 5/2005 | Rupprecht et al. | |
| 7,997,586 B2 * | 8/2011 | Ziegler | B24B 23/04 279/7 |
| 8,042,437 B2 * | 10/2011 | Maier | B23B 29/043 408/226 |
| 8,113,520 B2 * | 2/2012 | Zaiser | B24B 23/04 279/128 |
| 9,108,255 B2 | 8/2015 | Li | |
| 9,120,216 B2 | 9/2015 | Zhang et al. | |
| 9,517,510 B2 | 12/2016 | Zhang | |
| 9,555,554 B2 * | 1/2017 | Thorson | B23B 31/4073 |
| 9,737,969 B2 | 8/2017 | Bek et al. | |
| 2005/0095966 A1 | 5/2005 | Jasch et al. | |
| 2011/0086582 A1 | 4/2011 | Takemura et al. | |
| 2012/0169018 A1 | 7/2012 | Lu et al. | |
| 2014/0290072 A1 * | 10/2014 | Brown | B24B 23/04 30/272.1 |

FOREIGN PATENT DOCUMENTS

| | | | |
|---|---|---|---|
| CN | 100534708 | 9/2009 | |
| CN | 101837579 | 9/2010 | |
| CN | 102294682 | 12/2011 | |
| CN | 202114710 | 1/2012 | |
| CN | 102950586 | 3/2013 | |
| CN | 102974741 | 3/2013 | |
| DE | 29605728 | 9/1996 | |
| DE | 10030586 | 1/2002 | |
| DE | 102005031802 | 1/2007 | |
| DE | 202011050511 | 11/2011 | |
| DE | 102010046629 | 3/2012 | |
| DE | 102011005021 | 9/2012 | |
| DE | 102011005818 | 9/2012 | |
| DE | 102011085561 | 12/2012 | |
| EP | 0577579 | 1/1994 | |
| EP | 0596831 | 5/1994 | |
| EP | 1302286 | 4/2003 | |
| EP | 1 852 218 A1 | 11/2007 | |
| EP | 1852218 | 11/2007 | |
| RU | 2179106 | 2/2002 | |
| WO | WO 96/23627 | 8/1996 | |
| WO | WO 2005/049275 | 6/2005 | |
| WO | WO 2012007203 A1 * | 1/2012 | ........... B24B 45/006 |

OTHER PUBLICATIONS

Official Action for China Patent Application No. 201480043616.5, dated May 4, 2017, 16 pages.
Official Action for Australia Patent Application No. 2014298902, dated May 25, 2017, 4 pages.
Official Action for Australia Patent Application No. 2014298903, dated May 25, 2017, 3 pages.
Official Action (with English Translation) for CN Patent Application No. 201480043578.3, dated Feb. 24, 2017, 20 pages.
Official Action with machine translation for European Patent Application No. 14745083.7, dated Mar. 1, 2017, 8 pages.
Examination Report for EP Patent Application No. 14747835.8, dated Feb. 17, 2017, 7 pages (no translation).
International Search Report and Written Opinion prepared by the European Patent Office on Oct. 15, 2014, for International Application No. PCT/EP2014/002049.
U.S. Appl. No. 14/909,204, filed Feb. 1, 2016, Klabunde et al.
U.S. Appl. No. 14/909,247, filed Feb. 1, 2016, Klabunde et al.
International Search Report for International (PCT) Patent Application No. PCT/EP2014/002048, dated Nov. 19, 2014, 5 pages (with English translation).
Written Opinion for International (PCT) Patent Application No. PCT/EP2014/002048, dated Nov. 19, 2014, 14 pages (with English translation).
International Preliminary Report on Patentability for International (PCT) Patent Application No. PCT/EP2014/002048, dated Feb. 2, 2016, 16 pages (with English translation).
International Search Report for International (PCT) Patent Application No. PCT/EP2014/002049, dated Oct. 27, 2014, 6 pages (with English translation).
Written Opinion for International (PCT) Patent Application No. PCT/EP2014/002049, dated Oct. 27, 2014, 12 pages (with English translation).
International Preliminary Report on Patentability for International (PCT) Patent Application No. PCT/EP2014/002049, dated Feb. 2, 2016, 14 pages (with English translation).
International Search Report for International (PCT) Patent Application No. PCT/EP2014/002050, dated Feb. 10, 2014, 5 pages (with English translation).
Written Opinion for International (PCT) Patent Application No. PCT/EP2014/002050, dated Feb. 10, 2014, 13 pages (with English translation).
International Preliminary Report on Patentability for International (PCT) Patent Application No. PCT/EP2014/002050, dated Feb. 2, 2016, 15 pages (with English translation).
Search and Examination Report (with English machine translation) for Russian Patent Application No. 2016107074, dated Oct. 20, 2017, 22 pages.
Official Action for Australia Patent Application No. 2014298903, dated Dec. 8, 2017, 6 pages.

(56) References Cited

OTHER PUBLICATIONS

Official Action for U.S. Appl. No. 14/909,247, dated Nov. 20, 2017 11 pages.
Official Action for U.S. Appl. No. 14/909,204, dated Dec. 14, 2017 16 pages.
Official Action for Austalia Patent Application No. 2014298902, dated Feb. 13, 2018, 5 pages.
Official Action for Australia Patent Application No. 2014298903, dated Feb. 13, 2018, 3 pages.
Official Action for U.S. Appl. No. 14/909,204, dated Jul. 31, 2017 8 pages Restriction Requirement.
Official Action for U.S. Appl. No. 14/909,247, dated Jun. 23, 2017 9 pages Restriction Requirement.
Notice of Allowance for U.S. Appl. No. 14/909,204, dated Apr. 27, 2018 8 pages.

* cited by examiner

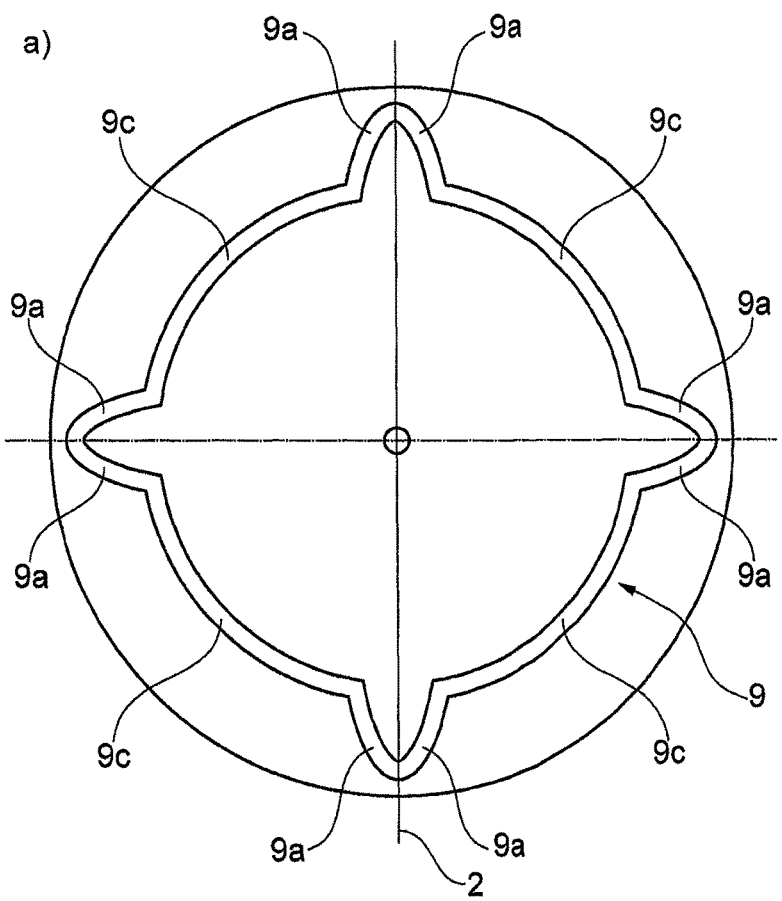
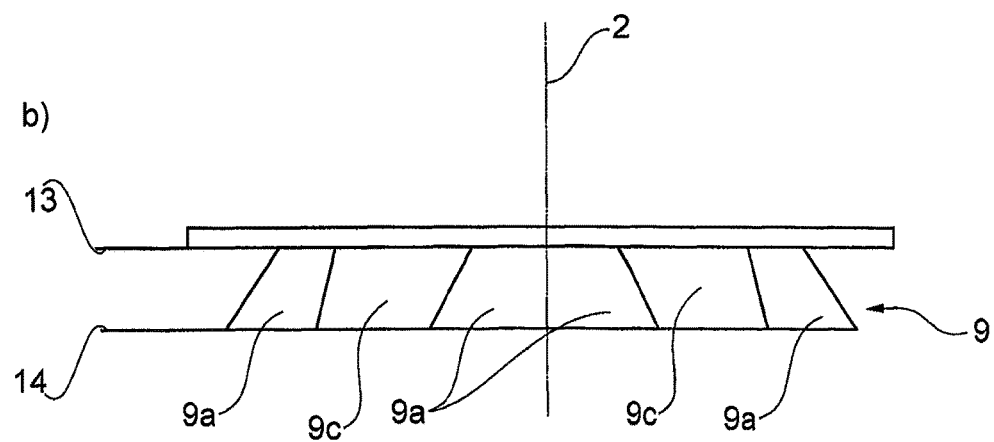
Fig. 3

POWER TOOL

CROSS REFERENCE TO RELATED APPLICATIONS

This application is a national stage application under 35 U.S.C. 371 and claims the benefit of PCT Application No. PCT/EP2014/002049 having an international filing date of 25 Jul. 2014, which designated the United States, which PCT application claimed the benefit of German Patent Application No. 20 2013 006 900.7 filed 1 Aug. 2013, the entire disclosures of each of which are incorporated by reference herein.

The entire content of the priority application DE 20 2013 006 900.7 is incorporated by reference into the present application.

The present invention relates to a machine tool, and in particular it relates to a hand guided machine tool having a tool receiving device rotating around an output shaft.

The invention will be described below mainly using the example of a particular hand guided machine tool that has a tool receiving device rotating around an output shaft. This limitation of the illustration is not intended to limit the possible uses of such a machine tool.

Instead of the term "tool receiving device", hereinafter will also be used in a more simple way the term "tool holder". But this too should not to be construed as a limitation.

A machine tool is a device which has one or more driving motors and possibly one or more transmission devices and at least one output shaft which has to be understood in the geometrical sense as an output shaft. At the output shaft, the tool receiving device is arranged directly or indirectly. The tool receiving device is the component or the components, by which the torque is applied to the tool, wherein preferably the tool receiving device also holds the tool, in particular a hand guided machine tool, so that the tool is both hold as well as applied with the output torque only by the tool receiving device. The term "output torque" and the further terms formed with the term "output" refers to the torque transmitted from the machine tool to the tool or the parts of the machine tool, respectively. The term "drive torque" refers to the torque absorbed by the tool.

A hand guided machine tool comprises a holding device, especially handles and the like, by which the machine tool can be guided by an operator with the tool attached thereto. Typically, hand guided machine tools are equipped with an electric driving motor, but there are also other types known and can be used for the present invention, such as hydraulically powered machine tools or pneumatically powered machine tools.

In the prior art, a variety of tools or tool devices are known, which are intended to be used with a machine tool having a circumferential tool receiving device. Such tools are, for example drills, grinding discs, cutting discs, circular saws, and so on. These tools are attached to the tool receiving device, which—depending on the application, the tool and the machine—rotates with a speed between near 0 up to some 1000 revolutions per minute, and in extreme cases also at a significantly higher speed. During the operation, the tool is brought in contact with a workpiece by a more or less high pressure, where it then carries out the corresponding machining operation. The machining forces occurring in the distance from the pivot, for example the cutting forces or the grinding forces result in a torque around the output shaft, which is compensated for by the output torque transmitted from the machine tool to the tool device.

The transmission of the output torque to the tool via the connection device of the tool by which it is fixed to the tool receiving device. For a tool which, during the machining, always rotates essentially in the same direction, therefore, the forces acting on the tool receiving device tool occur essentially in the same direction, but they are different in height.

In the prior art, machine tools having a rotating oscillating tool receiving device are also known. A machine tool having an oscillating tool receiving device or a rotating oscillating tool receiving device should here be understood as a machine tool with a movement of the tool holder device when the tool receiving device starts moving from a central position in a first rotational direction and it is braked to a stop and then the direction of rotation is reversed again until the moving is stopped.

The angular distance from the central position to the respective end position may typically be up to 5 degrees. However, for the implemented machines, usually, lower angle of 1 degree to 2.5 degrees are common, which corresponds to a total angular movement (1st to 2nd end position) from 2 degrees to 5 degrees. This oscillatory movement is typically carried out from 5,000 to 50,000 times per minute. However, there are also smaller and higher oscillation frequencies possible (here expressed as oscillations per minute)

A rotating oscillating drive of the tool receiving device, as it will be discussed in the present case, should here be understood as no hub oscillating drive, like it is known from a hacksaw device in particular. A hacksaw device should here be understood in particular as a keyhole saw device, a saber saw device or drywall saw device or the like.

The reversal of the direction of rotation causes that also the machining forces of the tool also change their direction, wherein as known the machining forces act always against the direction of movement or here against the rotational direction. From the machining forces changing their direction results a torque in correspondence to the lever arm, that is the distance of the processing point of the tool to the rotational axis, wherein the torque reverses the direction by the oscillation. The torque resulting from the machining forces is superimposed with another momentum, which is effective both during the machining but also in the idle, namely from the momentum of inertia of the tool torque for the decelerating of the tool after its highest speed (for example, each maximum amplitude of the sine curve for a sinusoidal rotational speed variation of the tool receiving device) and the reacceleration of the tool in the opposite direction occurring after the rotation reversal.

The torques that arise by the machining forces and by the kinematic factors of the oscillation are applied by the machine tool and introduced via the tool receiving device in the tool device.

The present invention has the object to design the machine tool in such a manner that the output torque can be reliably transmitted via the tool receiving device.

This object is achieved by the subject matter of claim 1.

The preferred embodiments of the present invention are the subject matter of the dependent claims.

The invention further relates to a machining system or a machine tool system including a machine tool according to claim 1 or one of the dependent claims and a tool device.

According to the present invention, a machine tool comprises a tool receiving device by which the tool device can be mounted on the machine tool in such a manner that its output shaft and a tool axis of rotation are substantially coincident. The term "output shaft" and "tool axis of rotation" denotes the geometrical axis of rotation of the machine tool and the geometrical axis of rotation of the tool device, respectively.

The tool of the invention comprises a tool receiving device, which is adapted to hold a tool device in such a manner on the machine tool that the output shaft and a tool axis of rotation are substantially coincident.

The tool receiving device can be firmly connected to the machine tool, but the tool receiving device can also be removably attached to an output shaft, output spindle or the like.

The tool holder device has a torque transmission region and a holding device. The torque transmission region is provided for the transmitting of the drive torque of the machine tool to a tool device. On the other hand, the torque transmission region is also provided to transmit a torque from the tool device to the machine tool, in particular a brake momentum resulting from the braking of tool movement.

The tool receiving device further comprises a holding device, which is provided to hold the tool during the operation. The holding device shall be designed in such a manner that both the force occurring at the idle state as well as the force resulting from the machining between the tool receiving device and the tool device can be accommodated in a reliable manner. In particular, the holding device is preferably designed in such a manner that both the forces, which are exerted by the tool device on the machine tool in the direction of the machine tool, as well as the forces, which are exerted away from the tool device toward the machine tool, are each accommodated in a reliable manner. As it will be later described in detail, the holding device is preferably designed in such a manner that although it prevents an unintentional release of the tool device from the tool receiving device, nevertheless, on the other hand, a simple change of the tool device is also possible.

The torque transmission region and the holding device can also be designed as a common device or as a common component.

The torque transmission region comprises at least two output area regions spaced apart to this tool axis of rotation, each having a plurality of surface points. The term "output area" (hereinafter sometimes referred to as "output area") refers to an area that directly or indirectly stands at least partially in contact with the tool device to transmit the output torque on the tool device. The term "surface point" here means points on the upper side of the output area and this should be understood geometrically.

The term is used to characterize the geometric point at which a tangent plane rests against the area. The vector on the surface perpendicular to the tangent point describes the orientation of the surface at this point in a space, which is defined by, for example, a three-dimensional coordinate system or by other reference planes or reference surfaces.

A surface has an endless number of surface points because every point on the surface is also a surface point in this sense at the same time. To describe a unidirectional curved surface or a multidirectional curved surface for the practice, however, it is sufficient to have a finite number of surface points. The term unidirectionally curved should be understood as a cylindrical surface, which is curved at each point in only one direction, for example a cylindrical surface. The term multidirectionally curved should be understood as a surface, which is curved at least in one point in several directions, for example a spherical surface.

A flat surface has only one tangent plane, which coincides with the surface itself. To characterize a flat surface, therefore a single surface point is sufficient, and this can be any point of the flat surface.

Since surface points are geometric points, they are not visible on the surface.

For the tangent planes to these surface points, special geometric conditions apply. The tangent planes, as usually in the geometry, are the planes which are formed perpendicular to the normal vectors of the surface points and which contact the surface at the surface point. The term "normal vector" means a vector which is oriented in this surface point exactly perpendicular to the surface.

The tangent planes on this surface points are inclined in two directions. On the one hand, the tangent planes are inclined against an axial plane, which includes the output shaft. Further, these tangent planes are inclined in regard to a radial plane, which extends perpendicular to the output shaft.

Thus, the arrangement of these output surfaces differs compared with the known prior art tool receiving devices for the oscillating machines.

For the known tool devices, as shown for example in the German patent applications DE 10 2011 005 818 A1 and DE 296 05 728 U1, the tools in the connecting area to the tool receiving device of the machine tool are of a substantially planar design. That means that they extend in this area in a plane, which is perpendicular to the output shaft. For such machine tools, the output areas are aligned perpendicular to the radial plane and parallel to the plane of the output shaft.

It should now already be noted that in a preferred embodiment, the output area is substantially flat, meaning that the normal vectors of all surface points are aligned parallel to one another and thus the output area only has a single tangent plane as a whole. However, within the scope of the present invention, is also possible that the output areas are curved in an unidirectional manner or in a bidirectional manner. In this it case, the normal vectors are then no longer parallel to each other.

The invention is based on the following considerations:

Both the tool receiving device as well as the region of the tool, onto which the torque is applied, are subjected to an alternating bending stress due to the oscillating moving. These are particularly problematic for the metallic materials from which the tool receiving device and the tools at issue here are usually made. The metals have a crystalline structure. If local overloads arise in a region of a metal component, that means that the stresses acting on the component at this point are higher than the stresses that can be tolerated by the component, then micro cracks can occur between the individual grains of the metal microstructure. These micro cracks affect the strength of the component in two respects. On the one hand, in the region where micro cracks have been incurred, no tensions are transmitted in the component. This means that the stresses within this region can be increased by the crack formation, which decreases the effective area for the force transmission.

On the other hand, a phenomenon arises that is commonly referred to as the "notch effect" in mechanical engineering. The name comes from the fact that in the region of a notch, especially when the notch is sharp edged, a local stress concentration occurs, which in the region of the surrounding notch material leads to shear stresses, which are higher than the shear stresses in the regions of the component which are not affected by such a geometry.

These increased stresses cause that the crack formation progresses, and it eventually leads to a failure of the component.

This process, which for example is documented in the works of Palmgren and Miner, is called damage accumulation.

The properties of a material or a component to tolerate swinging loads and in particular alternating bending stresses, is usually represented by the so-called SN curve of this component. The SN curve is based on the finding that an alternating load, for the Wöhler fatigue test it is called load changes, in particular for a steel comprising component can be tolerated in many cases on a permanent basis if the component can incur between 2 million and 6 million (in dependence on the material) such load changes at this load without a damage. In mechanical engineering, one speaks then of the so-called fatigue strength of the material or the component.

An oscillating driven tool swings, as indicated above, for example with a frequency of 20,000 oscillations per minute. This means 20,000 load cycles per min in the diction of the operation fixed component design or 1,2 million cycles per hour.

The lower fatigue limit of the stress-test of 2 million load cycles is thus exceeded already after 2 hours of operation of the machine tool or the tool.

Due to the inventive design, the torque load is increased that can be tolerated by the tool receiving device and the tool. This is firstly achieved in that the output areas are arranged at a distance to the rotational axis. Since the force that be accommodated by the tool is determined as the ratio of the torque and the distance, it follows $F_r=M/r$ (M measured as a torque in Nm, F as a force at the point r in N and r is the distance of the force application point away from the output shaft in m).

An enlargement of the force application point outwards, i.e. away from the output shaft or the tool axis of rotation, reduces the torque.

The slope of the output areas further results into that the force application point is as a whole increased, whereby the local load is reduced, and for an appropriate design, the introduction of the force in the remaining areas of the tool receiving device and the tool is improved.

A portion of the tool devices, which are commonly used at oscillating machines, has for example a work area, which is arranged in the circumferential direction, such as sawing tools and cutting tools. The working area of the tools thus extends substantially in a plane perpendicular to the axis of rotation of the tool.

For such tools, it is common in the prior art, that the connection region is also planar. The driving momentum is then initiated as a force in a direction perpendicular to the tool plane, for example by pins, a driving star or the like. In the tool plane, the tool is especially stiff, so that the introduction of the force is performed only over a relatively small area. In this area, it can then lead to higher local stresses, which lead to a reduction in the operational stability of the tool.

According to the present invention, for such a tool, the force transmission is carried out at first from the inclined area into the flat area. Thereby—with a corresponding design—it increases the force transmission area, and thereby it reduces the local load.

It should be noted at this point that it is essential to reduce the peak loads. Because the wear or even the destruction of the tool is generated and further promoted just by the above described stress concentrations that lead to micro cracks. A reduction of the peak stress concentrations can achieve a significant extension of the life of the tool and of the tool receiving device.

According to a preferred embodiment, there is at least one output area region, for which at no surface point, the normal vector on this surface point passes on a straight line extending through that the output shaft. Therefore, such an output area region is at no surface point oriented toward the output shaft, but the output area region is "twisted" in regard to the output shaft.

As already explained above, the output areas are preferably designed substantially flat. This means that the output areas have a planar region with essentially the same tangent plane, which may be limited by edges, single curved surfaces or multiple curved surfaces, and so on. Respectively, by edges or curved areas, they can pass over into other areas of the tool receiving device, in particular the torque transmission region.

The advantage of the planar output areas is that by these a tool receiving device and a tool device can be provided, which on the one hand both can be secured without clearance on the tool receiving device of the machine tool—if it is designed accordingly—and for which, when appropriate tolerances and material properties such as elasticity etc are provided, a surface contact between the tool receiving device of the machine tool and the tool device is possible, whereby the region of the force transmission is increased.

According to a further preferred embodiment, the output areas are curved, at least in sections. The curvature may be designed both unidirectional as well as bidirectional, convex or concave with a fixed radius of curvature or a variable radius of curvature.

The curved areas can also be designed such that by their shape and elasticity of the material, they are subjected to an elasticity, by which the curvature changes, and in particular by which the curvature disappears essentially from a certain load. That means that a substantially planar output area is provided. More preferably, these output areas of the machine tool and the equivalent areas of the tool device fit together.

In a preferred embodiment, the machine tool, in particular the tool receiving device, comprises in the region of the torque transmission region at least a first upper boundary plane and at least a second lower boundary plane. In this case, these boundary planes are disposed substantially perpendicular to said output shaft. Further preferably, these two boundary planes are spaced apart. Preferably, each of these output surface areas is arranged between one of these first upper boundary planes and one of these second lower boundary planes, preferably in such a manner that the output surface region contacts the respective boundary plane, but that it does not cut it. In particular, by the arrangement of at least one output area region between these boundary planes, a very large output area region can be achieved and the stress on this output area region is correspondingly low. Preferably, a first group of output area regions, but at least one output area region is arranged between one of said first upper boundary planes and one of said second lower limit levels, and more preferably a second group of output surface areas is arranged between a further first upper boundary plane and a further second lower boundary plane. In particular, by the grouping of several output area regions and by the assignment of boundary planes, both a simple production of the torque transmission region is possible, and secondly, a particularly homogeneous application of the driving force on the tool device can be achieved.

In a preferred embodiment, a plurality of output surface regions extends between a single first upper boundary plane and a single second lower the upper boundary plane. More preferably, all of these output surface regions extend between a single first upper boundary plane and a single second lower boundary plane. In particular, by the extension of these output areas between one first upper boundary plane and one second lower boundary plane, a torque transmission area with low space requirement can be achieved, and moreover, a lower necessary material usage can be achieved. It is also advantageous, in particular, by this type of design of the output surface areas, to achieve that the driving forces are transmitted in a particularly uniform and thus gentle manner to the material to the tool device. In particular, the torque transmission region is relieved and a long service life can be achieved.

In a preferred embodiment, the torque transmission region comprises a plurality of output surface regions. Preferably, said plurality of output surface regions is arranged rotationally symmetrical around the output shaft.

"Rotationally symmetrical around the output shaft" in the sense of the present application should mean that the plurality of output surface regions merges—seen geometrically—into itself by rotating around the output shaft by at least an angle being greater than 0 degrees and smaller than 360 degrees—or also by any angle. In particular, one of these angles is 360 degrees/n, where n is a natural number greater than 1.

In particular, by a rotationally symmetrical arrangement of the output surface regions, it is possible to reduce the additional stresses on the torque transmission region and to evenly stress the output surface regions, respectively, and thus in particular to achieve an increased service life.

In a preferred embodiment, at least two of these output surface regions are arranged symmetrically to a plane of symmetry. Preferably, this plane of symmetry coincides with one of these axial planes. Preferably, more than two of the output surface regions are arranged symmetrically to the plane of symmetry, preferably four. In particular, in this plane of symmetry is the output shaft is arranged. More preferably, these output surface areas are arranged substantially contiguously. An abutting arrangement in the sense of the invention can be in particular understood as such an arrangement, when the output surface regions are connected by a transition region. Preferably, such a transition region may be formed by a curved surface region or by an at least partially flat extending surface region. More preferably, such a transition region abuts tangentially on at least one, preferably on both of these output surface regions. In particular, by a symmetrical and also abutting arrangement of the output surface regions, a particularly high stability of the torque transmission region can be achieved, and therefore a good force transmission to the tool device can be achieved.

In a preferred embodiment, the torque transmission region of the machine tool has a side wall. Preferably, said side wall is extending radially spaced from the output shaft. More preferably, this side wall is extending between the first upper boundary plane and the second lower boundary plane, and preferably it has a wall thickness which is variable in the direction of the output shaft, particularly preferably, it has a substantially linearly increasing wall thickness in the direction to the machine tool. Preferably, this side wall comprises the output surface regions. In particular, the design of the torque transmission region with a side wall results in a substantially hollow conical recess in the region of the torque transmission region, but this hollow conical recess has no circular cross-section, but a cross section with a variable spacing of the side wall to the output shaft in a direction orthogonal to the output shaft plane. In particular, by the described type of embodiment of the torque transmission region, a particularly stable torque transmission region, and thus a good introduction of the momentum into the tool device can be achieved.

In a preferred embodiment, this side wall extends essentially radially closed around the output shaft. In another embodiment, the side wall has on in its extension to the output shaft recesses or interruptions. In particular, by a closed circumferential side wall, a particularly stable torque transmission area can be achieved; by a broken side wall or by a side wall having recesses, a particularly facilitated torque transmission region can be achieved which has a low momentum of inertia.

In a preferred embodiment, one of the normal vectors on one of these tangent planes is oriented away in the radial direction away from the output shaft. It should be noted that the terms normal and normal vector are used interchangeably in the context of these explanations. Preferably, the normal vectors of several, preferably of all of the tangent planes in the radial direction are oriented away from the output shaft. In particular, by this orientation of the tangent plane, the torque transmission region provides the shaft member as compared with a conventional shaft hub connection. This configuration of the torque transmission region provides in particular the possibility of a simple production, and the driving forces of the machine tool can be transmitted on the tool assembly in a particularly uniform manner.

In another preferred embodiment, one of the normal vectors on one of these tangent planes is oriented in the radial direction toward to the output shaft. Preferably, the normal vectors of several, preferably of all of these tangent planes in the radial direction are oriented toward to the output shaft. In particular, by this orientation of the tangent planes, the torque transmission region provides the hub part as compared to a conventional shaft hub connection. With other words, the torque transmission region comprises, in particular, at least partially a recess. In such a configuration of the torque transmission region, the forces are transmitted from the machine tool to the tool device, in particular through internal surfaces (hub portion). Especially, such surfaces are well protected from dirt and damage.

In a preferred embodiment, the angle $\alpha$ is included between one of these tangent planes and this radial plane, wherein said radial plane is perpendicular to the output shaft. Preferably, the angle $\alpha$ is selected from a certain range, wherein the angle $\alpha$ is preferably smaller than 90 degrees, in particular it is smaller than 80 degrees and most preferably it is smaller than 75 degrees. Furthermore, preferably, the angle $\alpha$ is greater than 0 degrees, in particular it is greater than 45 degrees, and most preferably it is greater than 60 degrees. More preferably, the angle $\alpha$ is in a range between 62.5 degrees and 72.5 degrees. Preferably, the angle $\alpha$ is selected in the above mentioned range due to the component properties (in particular the geometry, the wall thickness, the modulus of elasticity, the strength and the like) of the torque transmission region and/or the tool device and/or it is preferred because of the occurring forces. In particular, by the previously described selection of the angle $\alpha$ out of said range, a stable torque transmission region can be achieved, and on the other hand also a uniform introduction of the driving forces into the tool device. It is usually preferred to choose the angle $\alpha$ smaller than 70 degrees, since the risk of jamming is then lower. Here, the term "jamming" should be construed in such a way that the tool device can not be removed from the machine tool as scheduled, which means in particular without an additional force. Effects similar to this "jamming" are known in mechanics especially as a self-locking. As an advantage, an angle α, which has been selected from said range (α≥70 degrees), results into a particularly low space requirement. As a further advantage, the tendency to the jamming of the tool device can be reduced in this torque transmission region by a smaller angle α (α<70 degrees). As a particularly preferred range for the angle α, the range of 60 degrees (+/−5 degrees) has shown that in this way a relatively small installation space can be achieved and that an accidental jamming of the tool device can be reduced or avoided.

In a preferred embodiment, the angle β is enclosed between one of these tangent planes and this axial plane, wherein the output shaft is located in this axial plane. Preferably, the angle β is selected from a certain range, wherein the angle β is preferably smaller than 90 degrees, in particular it is smaller than 70 degrees, and most preferably it is smaller than 65 degrees. Furthermore, preferably, the angle β is greater than 0 degrees, preferably it is greater than 15 degrees and most preferably it is greater than 30 degrees. More preferably, the angle β is substantially 30 degrees, 45 degrees or 60 degrees. More preferably, the angle β deviates only slightly from one of the aforementioned three values of the angle, wherein preferably slightly below a range should be understood as of preferably +/−7.5 degrees, in particular of +/−5 degrees and most preferably of +/−2.5 degrees. In particular, by the described selection of the angle β out of said range, a particularly stable torque transmission region can be achieved, and thus a uniform torque introduction from the machine tool to the tool device can be achieved. The transmittable torque increases in particular with a decreasing angle β. Preferably, for configurations which desire a high transmittable torque, the angle β is selected from a range of 0 degree<β<30 degrees. In particular, the space requirements decrease with an increasing angle β. Preferably, for configurations that desire a small space requirement, the angle β is selected from a range from 60 degree<β<90 degrees. In a particularly preferred embodiment, in which a large torque is particularly transmittable and a low space requirement is desired, the angle β is essentially 60 degrees.

In a preferred embodiment, the torque transmission region has an even number of output area regions. Preferably, the torque transmission region has 4 or more output area regions, in particular it has 8 or more output area regions, and most preferably it has 16 or more output area regions. Furthermore, preferably, the torque transmission region has 64 or less output area regions, in particular it has 48 or less output area regions and most preferably it has 32 or less output area regions. Furthermore, preferably, the torque transmission region has an odd number of output area regions, and preferably it has even number of output area regions. Preferably, the number of the output area regions is a function of the size of the torque transmission region. More preferably, a large torque transmission region may also have larger numbers of output area regions than those specified here. Here, a large torque transmission region should be understood in particular as a torque transmission region, which has essentially a diameter exceeding 50 mm or more. Particularly preferably, the torque transmission region has a diameter of substantially 30 mm. It has been found that such a diameter, in particular for hand guided machine tools having an oscillating drive, on the one hand, have a small space requirement, and on the other hand, the driving forces can be transmitted securely. In particular, by the even number of the output area regions, the driving forces of the machine tool can be transferred in pairs on the tool device. It has been found that a particularly durable and thus improved torque transmission region can be achieved, in particular by this introduction in pairs of the driving forces on the tool device.

In a preferred embodiment, the output area regions are substantially arranged in a star-like manner. Preferably, the output area regions are substantially arranged in a star-like manner around the output shaft. Further preferably, by the output area regions, a three-dimensional body or a three-dimensional recess is at least in sections defined. Being cut by a plane orthogonal to the output shaft, it has essentially the base area of a star-shaped polygon.

In the sense of the present invention, the term polygon should not only be understood to be the mathematically exact form having obtuse angled corners or acute angled corners, but it should also be understood as a form in which the corners are rounded.

Preferably, said star-shaped polygon is rotationally symmetrical. More preferably, these star-shaped output area regions are similar to a toothed shaft of a conventional shaft hub connection, wherein this shaft has a conical basic shape due to the double slope of the output area regions. In particular, by the star-shaped arrangement of the output area regions, it is possible to arrange a plurality of output area regions in a small space and to transmit securely such high driving forces from the machine tool to the tool device.

In a preferred embodiment, the machine tool has an encoding device or an encoding element. Preferably, such an encoding device comprises a cross-sectional area, preferably the cross-sectional area is arranged in a plane which is arranged substantially orthogonal to this output shaft. Preferably, this encoding device has an axial extension substantially orthogonal to this cross-sectional area, and therefore in particular parallel to this output shaft. In particular, by this axial extension and its alignment, it can be achieved that an encoding device of the tool device cooperates particularly well with this encoding device of the machine tool, and thus it can be achieved that the tool device is particularly securely received on the machine tool.

In a preferred embodiment, one of these encoding device is arranged rotationally symmetrically around this output shaft, and therefore in particular also in regard to this tool axis of rotation. Preferably, a plurality of the encoding devices is arranged with a rotational symmetry around this output shaft. Preferably, said encoding devices are being displaced by predetermined angle increments around the output shaft, further preferably they are arranged on a common pitch circle diameter. Preferably, the angular increment has the magnitude of 1 degree, 2.5 degrees, 10 degrees, 15 degrees, 22.5 degrees, 30 degrees or 45 degrees. Furthermore, preferably, they are an integral multiple of such an angular increment. More preferably, these encoding devices are offset equidistant to the angular increments. More preferably, these encoding devices are offset around a full circle of 360 degrees at equidistant angular increments, preferably 2 times 180 degrees, 3 times 120 degrees, 4 times 90 degrees, 5 times 72 degrees, 6 times 60 degrees, 8 times 45 degrees, 9 times 40 degrees, 12 times 30 degrees or 16 times 22.5 degrees or the like. In particular, by this distribution of the encoding devices, it is possible to offset the tool device according to the present angular increments around the output shaft and to receive it safely again, thereby a very secure receiving of the tool device and in particular a rapid on-setting of the tool device is provided in the machine tool.

In a preferred embodiment, the encoding device, in particular the cross-sectional area of at least one encoding device is selected from a particular group of geometric shapes. Here, this group comprises preferably:

a polygon having a plurality of corners, preferably 3, 4, 5, 6, 7, 8, 9, 10 or more corners,
a circle,
an ellipse,
a spline,
a base form with several straight lines, which are connected by arcs or
a combination of several of these shapes.

In particular, the encoding device of the machine tool has the shape opposite same of the encoding device on the tool means in order to cooperate preferably with this (tongue and groove principle).

In a preferred embodiment, the holding device is selected from a group of holding devices, which enables a secure fixing of the tool device on the machine tool. Preferably, the holding devices allow such a secure fixing, wherein the holding devices can make directly or indirectly a force fit connection or a form fit connection between the tool devices and the machine tool. Such a group of holding devices comprises at least one of the following devices or a combination of two or more of the following devices:
a screw device,
a tie bean device,
a hook device,
a clip device,
a ratchet device,
a bayonet closure device,
a device with locking projections, and
a device with ball sections and blocking sections, and in particular with spherical cap recesses or the like.

Preferably, a screw device should be understood to be a device, which comprises one or more threaded portions, more preferably, it comprises at least a male member and a female member. Preferably, a tie bean device should be understood to be a device, onto which along a, preferably, longitudinal axis, a holding force can be applied on, and wherein this holding force acts on the tool device. Preferably, the tie bean device has at least one clamping area, onto which the holding force can be applied on the tie bean device, a transmission area and a holding area. Preferably, the tie bean device acts with this holding area directly or indirectly on the tool device, and more preferably, the holding force of the clamping area is transmitted to this holding area by this transmission region.

Further preferably, a hook device should be understood to be a device, which can be rotated, pivoted or slidden, wherein this device has an active surface for transmitting the action of the holding force on the tool device.

Further preferably, a clip device should be understood to be a device, which can be moved, preferably against a spring force action. Preferably, the clip device includes a first tensioned operating state, and a second non-tensioned or a partly non-tensioned operating state. Preferably, when no tool device is added to the machine tool, the clip device is in this non-tensioned state or in this tensioned state. Further preferably, when a tool device is accommodated in the machine tool, the clip device is in this non-tensioned or in this partly non-tensioned state, and preferably, it directly or indirectly provides for a force fit connection between the tool device and the machine tool.

Further preferably, a ratchet device should be understood to be a device, which prevents by at least one or preferably a plurality of ratchet members, a movement of the tool device at least in a direction opposite to the machine tool by means of a force fit connection, wherein such ratchet members are movably mounted.

Further preferably, a bayonet closure device should be understood to be a device, which comprises at least one form fit element, and preferably several form fit elements. Preferably, such form fit elements cooperate with opposite surfaces, whereby preferably the opposite surfaces or the positive locking elements are disposed indirectly or directly on the tool device, and in each case, the other sections (mating surfaces, form fitting elements) are arranged on the machine tool. Further preferably, a device with locking projections should be understood to be a device, which directly or indirectly makes a form fit connection between a tool device and the machine tool.

Further preferably, a device with ball sections and blocking sections should be understood to be a device, which comprises at least one spherical area or at least one ball portion and a blocking portion, into which this spherical area or this ball can engage. Preferably, at least one of these blocking portions comprises a prismatic area, a cylindrical area or a spherical cap shaped area for engaging the spherical area or the ball. Wherein by this interaction, a form fit connection between the tool device and the machine tool is made directly or indirectly.

A machine tool system or a machining system, respectively comprise a machine tool according to the present invention and at least one tool device for the use with this machine tool. In this case, the holding device comprises least on an operating area for the transmission of the force acting on the tool device. This opposite area is preferably arranged on the side of the holding device facing the machine tool. Further preferably, the holding device comprises a holding device boundary surface. This holding device boundary surface is arranged on the side of the holding device facing away from the machine tool side. Preferably, the operating area of the holding device is adapted to transmit a holding force to the tool device. Preferably, the holding device boundary surface is arranged substantially opposite to the operating area.

The tool device comprises a tool attachment region and a tool axis of rotation. In this case, this tool attachment region has at least one side wall. This tool attachment region extends in an axial direction between a first orthogonal plane and a second orthogonal plane, wherein at least one component of the extension of the tool attachment region is facing towards the tool axis of rotation. In this case, such an orthogonal plane is arranged in particular orthogonally to the tool axis of rotation. More preferably, this side wall is radially spaced to this tool axis of rotation and it has an axial extension in the direction of the tool axis of rotation. More preferably, this side wall is extending radially closed or preferably interrupted or with these recesses around the tool axis of rotation.

If the tool device is accommodated in the machine tool, by this holding device, a force action is exerted in the area of the operating area of the holding device, in particular a holding force effect, which holds the tool device on the machine tool. This force action, in particular the holding force action has at least one component in the direction of the tool axis of rotation, and preferably this component of the force action is substantially parallel to it.

In a preferred embodiment, the holding device boundary surface and the operating surface of the holding device are arranged between the first orthogonal plane and the second orthogonal plane of this tool connection region, when the tool assembly is received on the machine tool. Further preferably, the holding device boundary surface and the operating surface of the holding device are arranged in the axial direction in the region of the axial extension of the tool driving surface regions, when the tool device is received on the machine tool. Preferably, the tool connection region forms an annular shape, and preferably it forms a conical shape. Further preferably, the operating area of one the, preferably of all the holding devices is disposed radially and axially inward of this shape, when the tool device is received on the machine tool. In particular, by such a configuration of the tool device and the machine tool, it is possible that the holding device does not protrude axially over the tool device. Thus, a particularly safe operation of the machine tool system is made possible.

In a preferred embodiment, the side wall of the tool device has tool driving area regions. Preferably, these driving area regions extend in the radial direction at least partially between a first radial distance and a second radial distance to this tool axis of rotation. Further preferably, one of these areas is adapted for the transmission of the torque or the transmission of the driving force from the machine tool to the tool device. Further preferably, the torque transmission area of the machine tool has at least partially the geometric conjugated progression to this tool driving area region. In particular, by this radial extension of tool driving area region, a form fit driving force transmission is possible, and therefore it allows for a particularly safe form of the driving force transmission from the machine tool to the tool device.

In a preferred embodiment, the side wall of the tool device comprises tool driving area regions. Preferably, the side wall has, at least in sections, the conjugated progression to this output area regions of the torque transmission region. Further preferably one of these, more preferably several of these, and most preferably all these tool driving area regions contact this output area regions at least partially in the form of a point contact, preferably in the form of a line contact and particularly preferably in the form of an area contact. In particular, by means of a point contact, a particularly simple positioning of the tool device is enabled in regard to the machine tool; in particular, by means of an area contact, a transmission of larger driving forces is enabled in regard to a point contact; in particular by means of an area surface, a transmission of larger driving forces is enabled in regard to a line contact. Especially by a line contact or by a point contact, an elastic deformation of an output area region or tool driving area region is enabled, so that several driving/ output surface area regions can be contacted and a greater driving force can be transmitted.

The following figures show various features and embodiments of the invention and they are partially in a schematic form, wherein a combination of the individual features and the embodiments beyond the figures is also possible.

Figure 2:
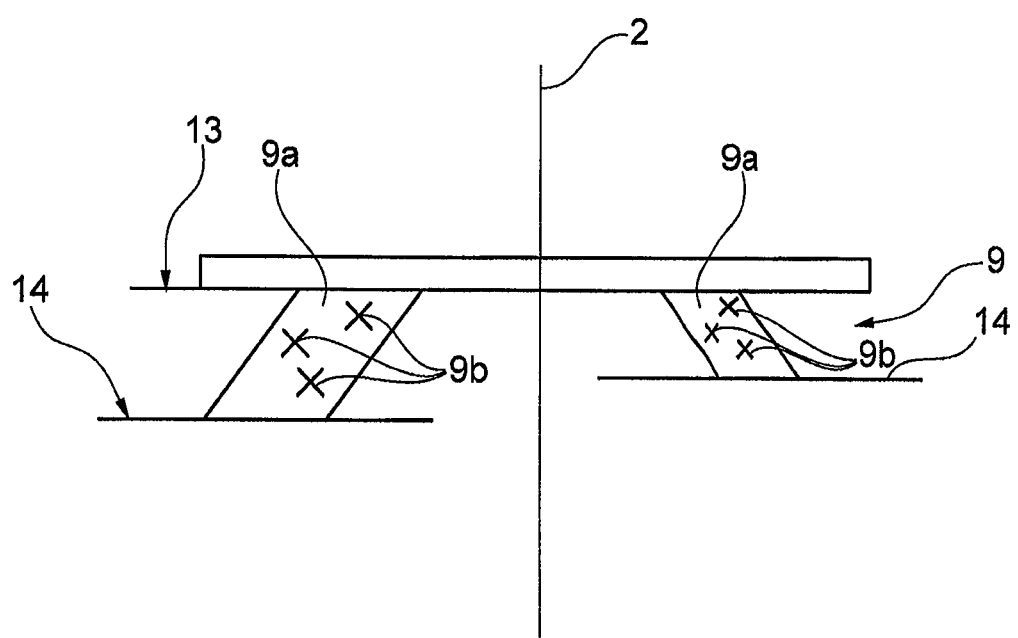
Figure 4:
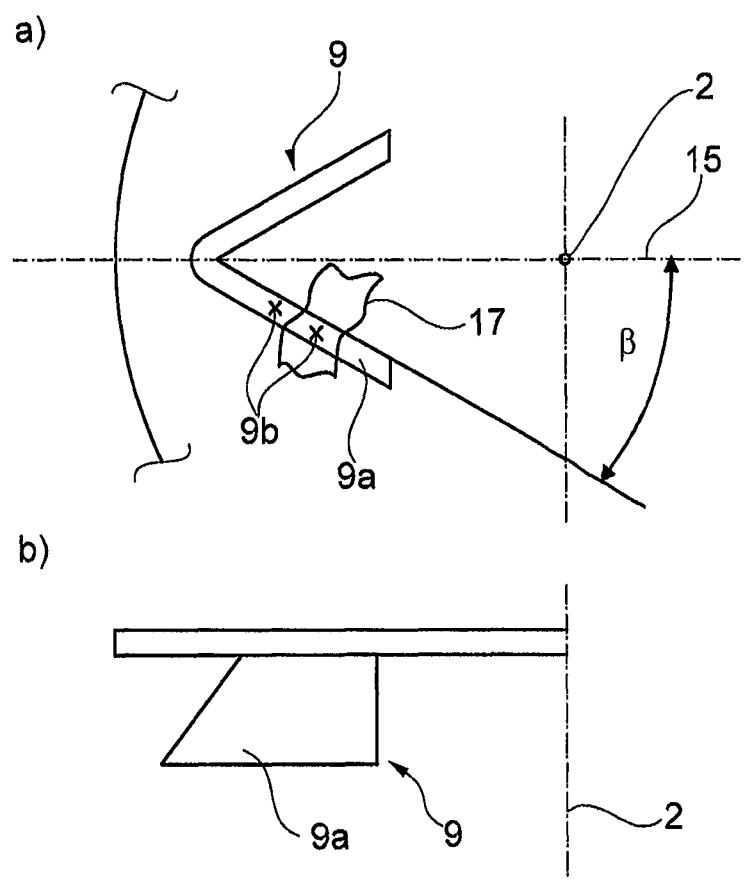
Figure 5:
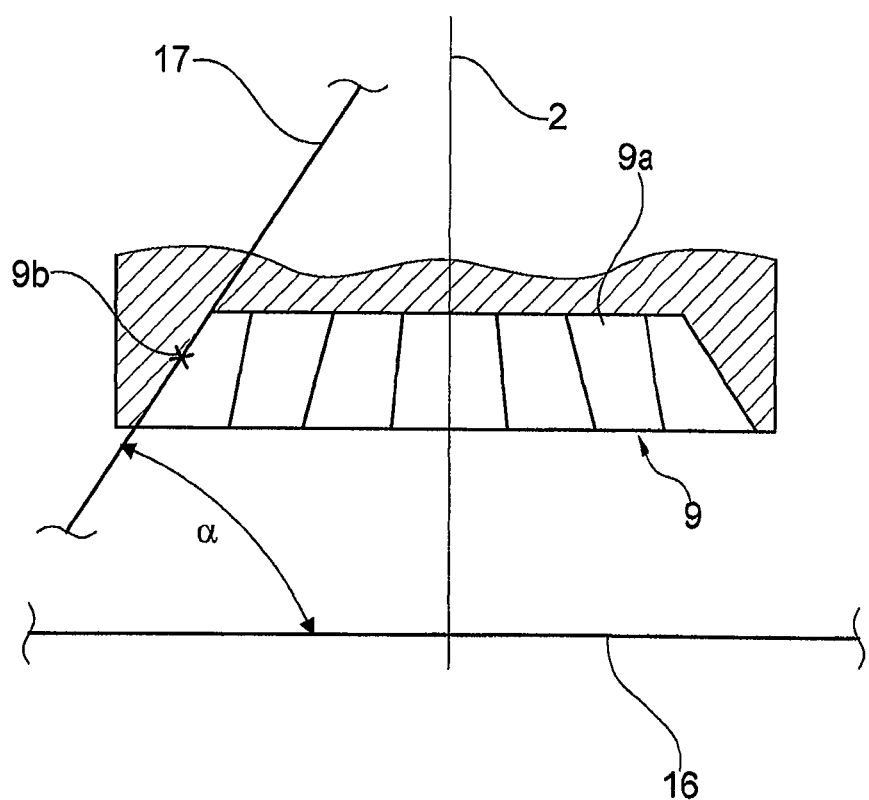
Figure 6:
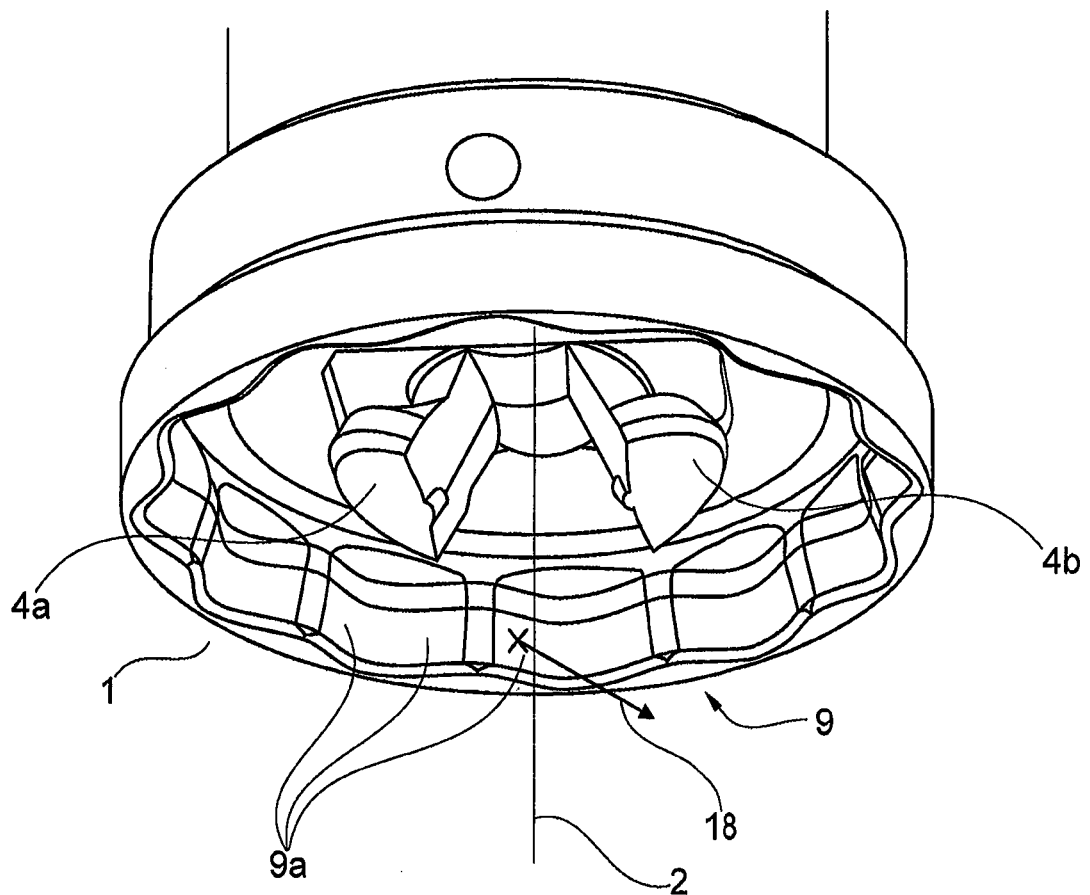
Figure 7:
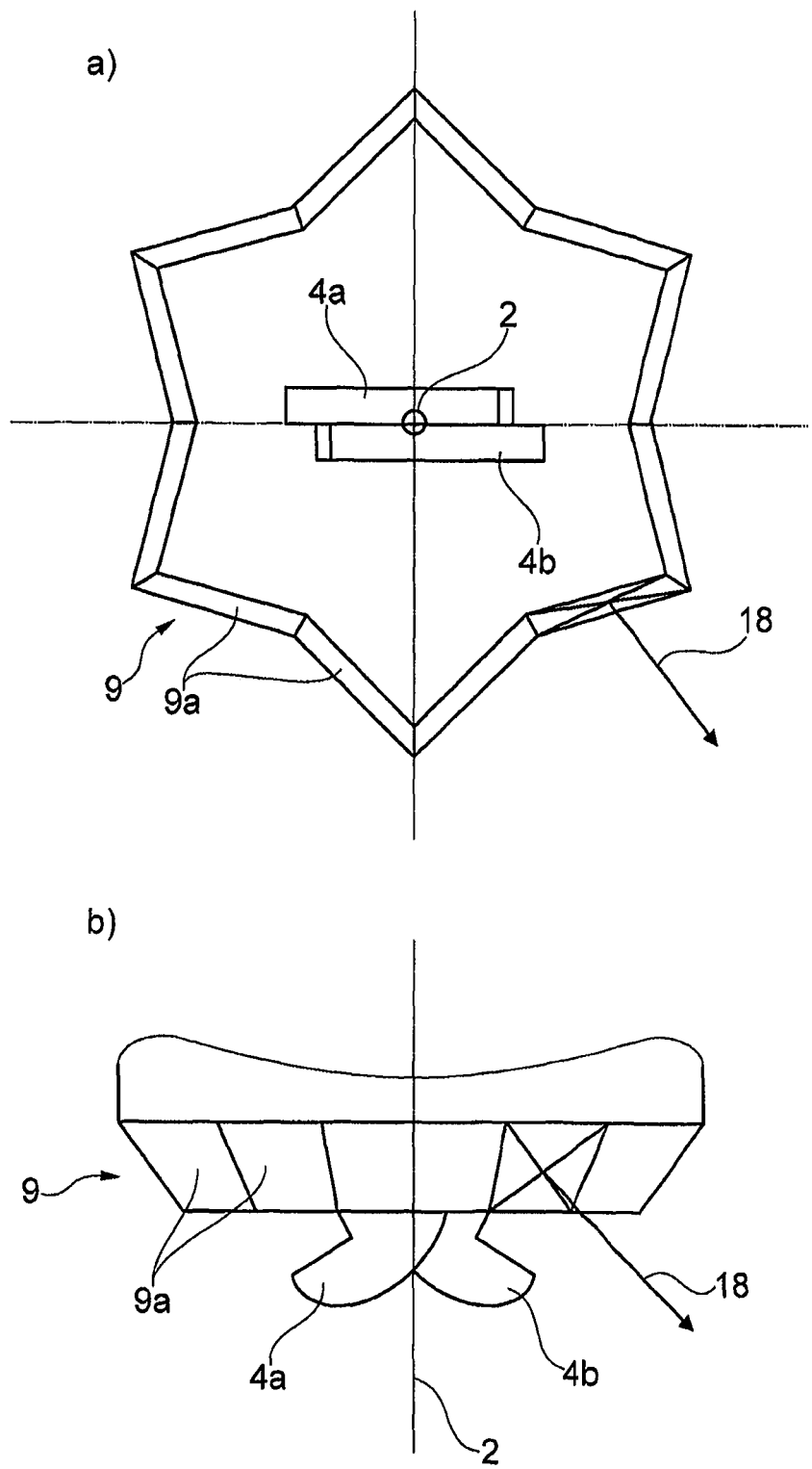
Figure 8:
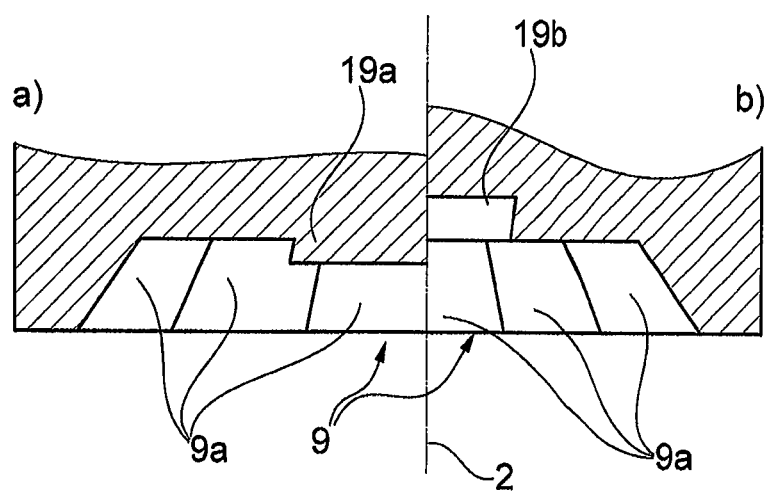
Figure 9:
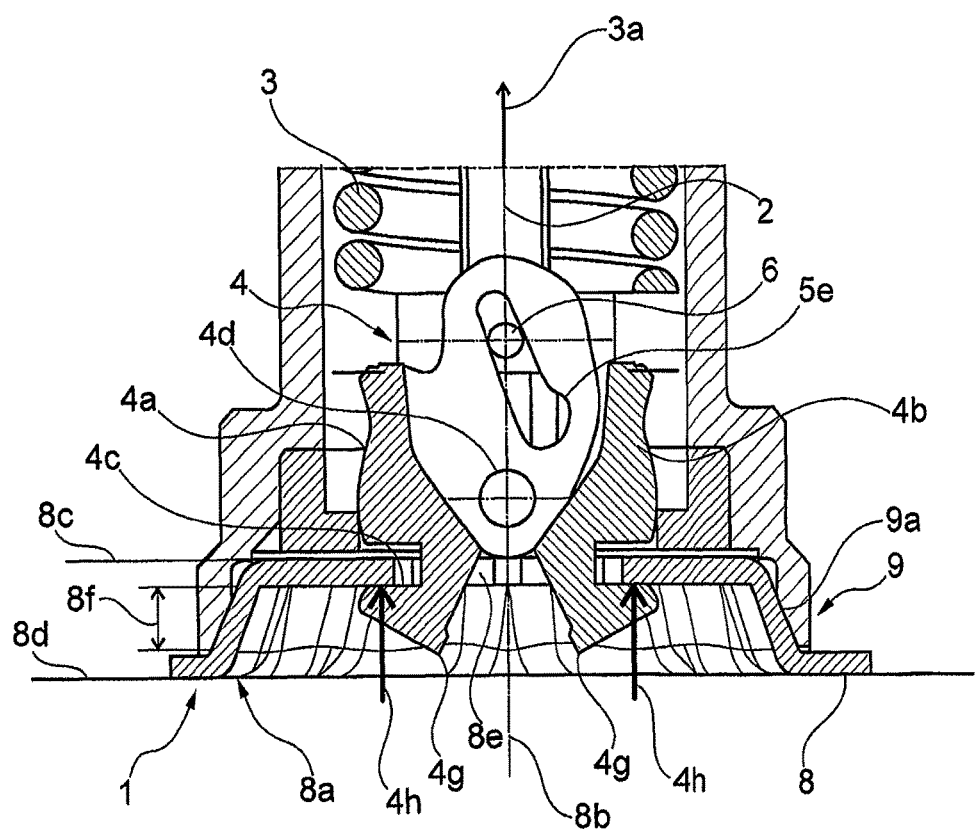
Figure 10:
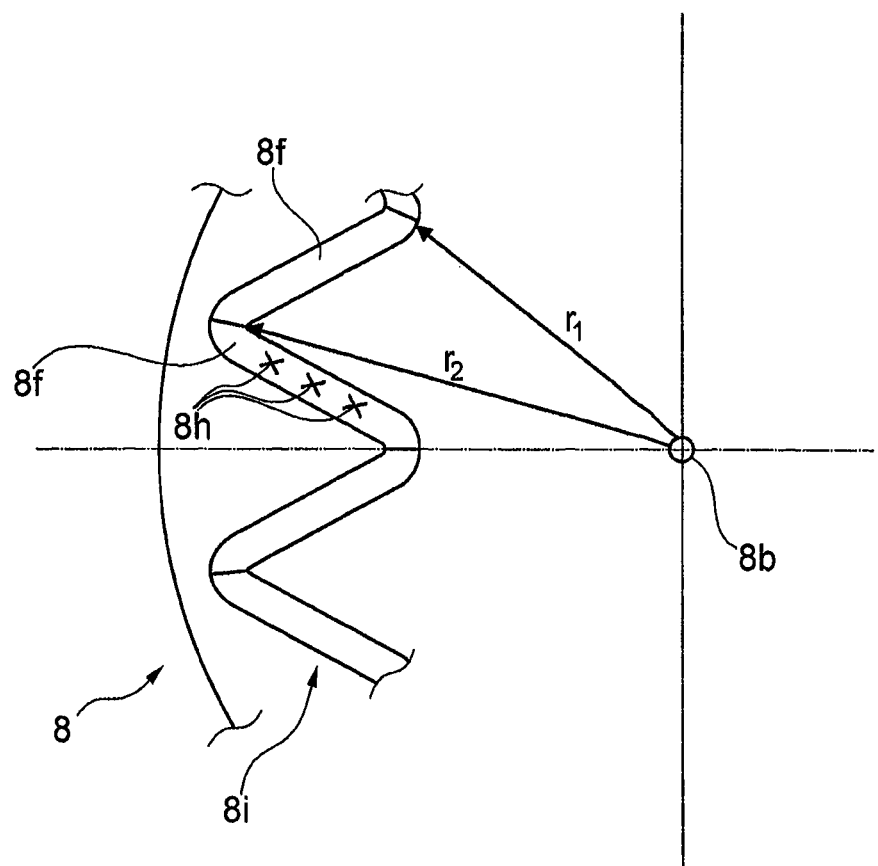
Figure 11:
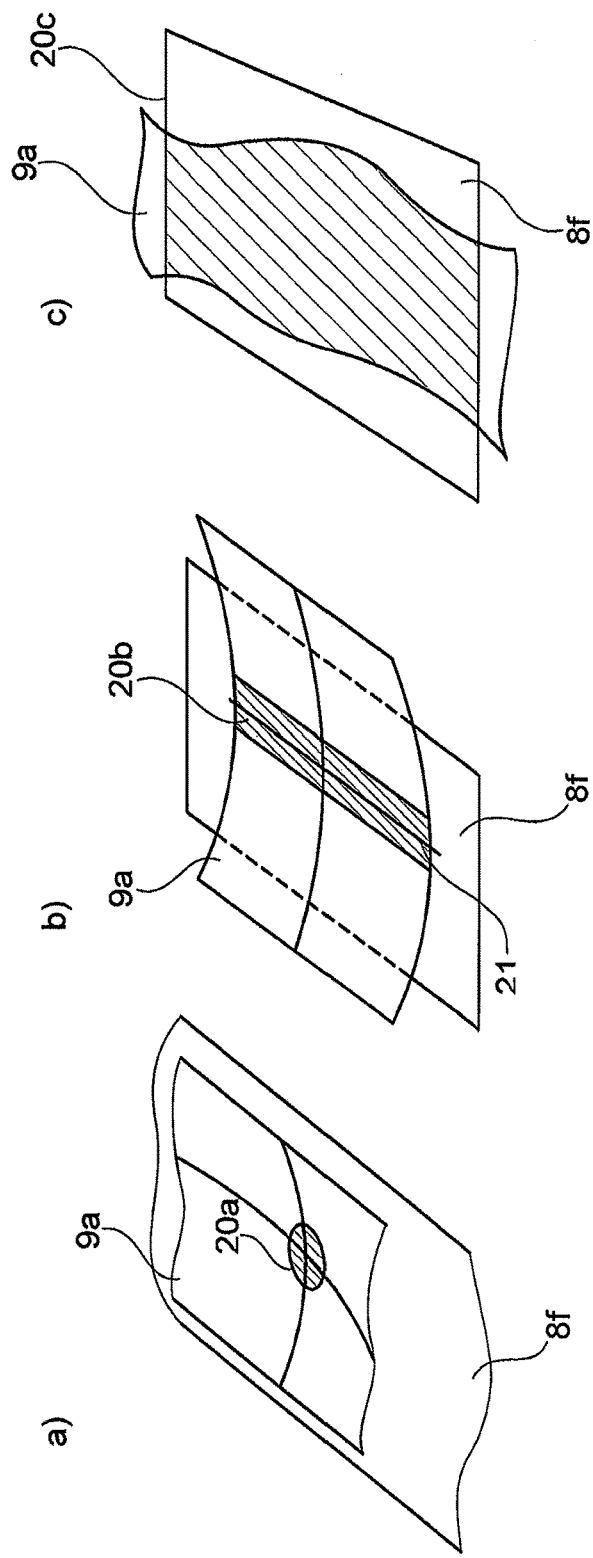
Figure 12:
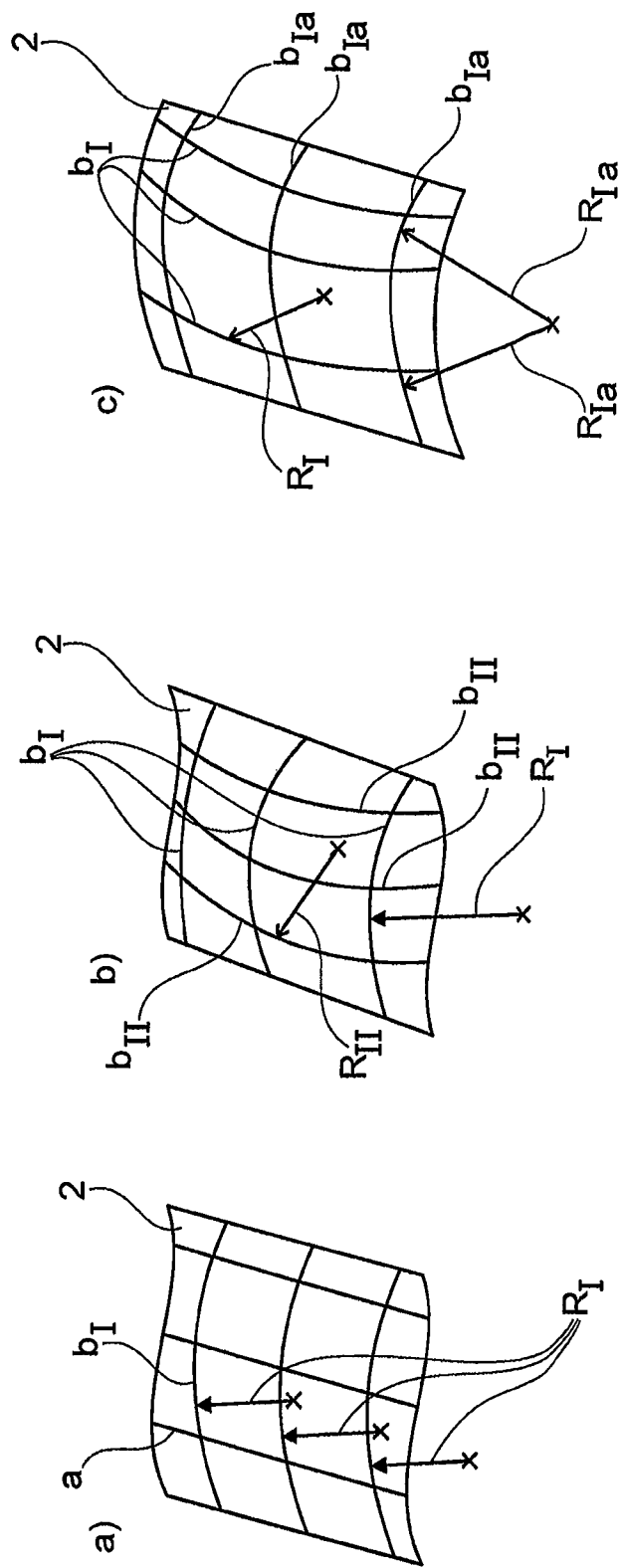
Figure 13:
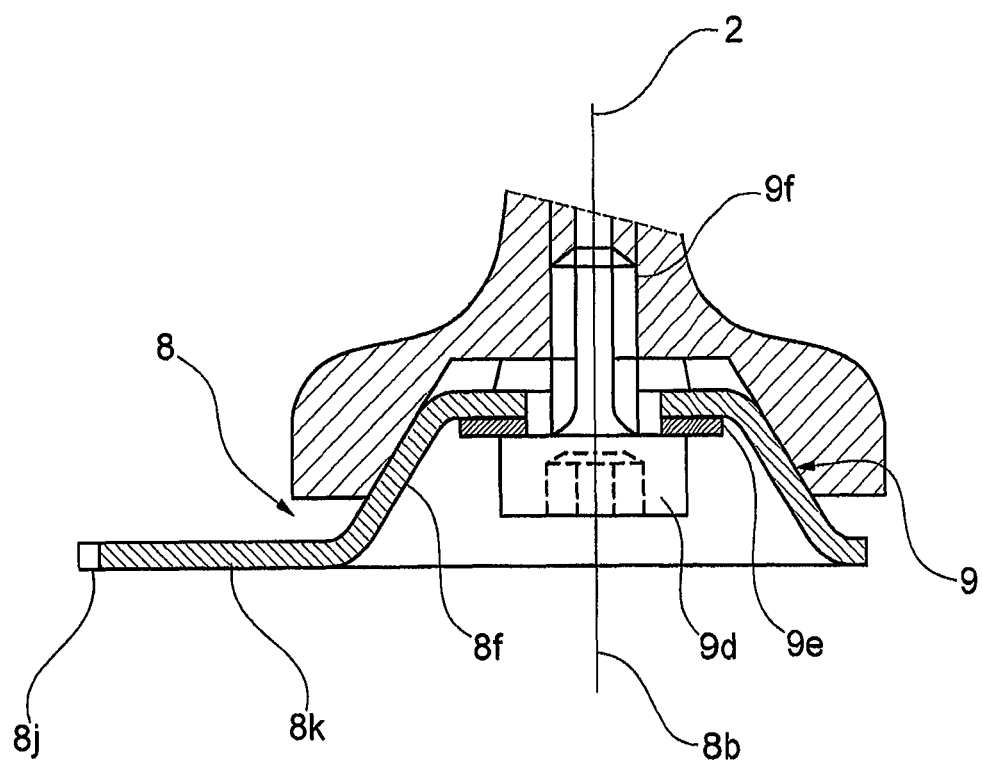
Figure 14:
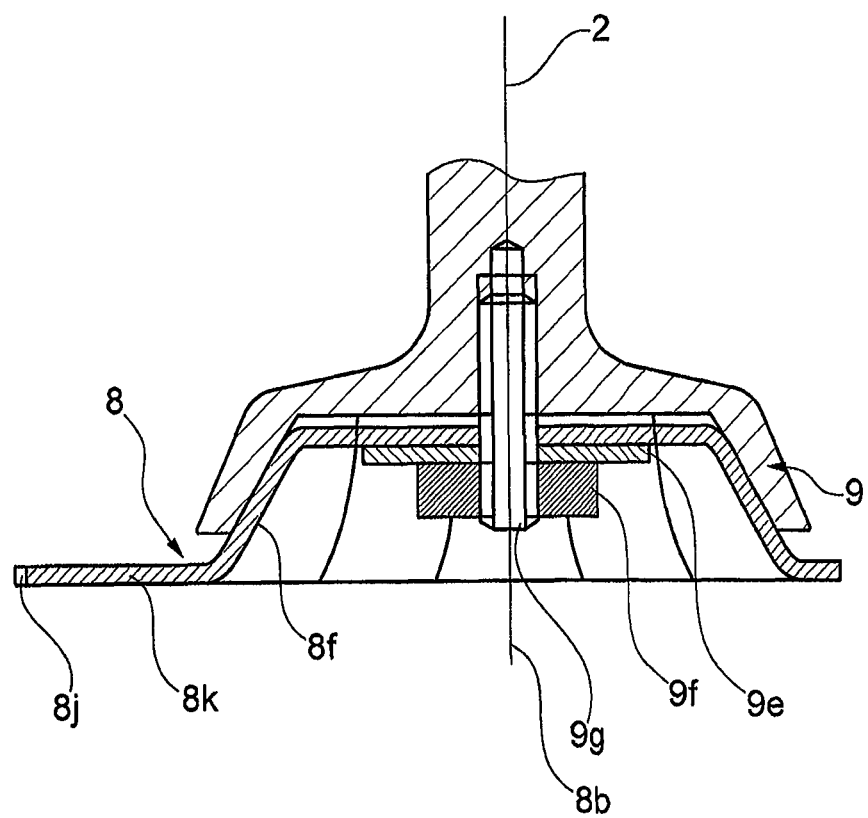
Figure 15:
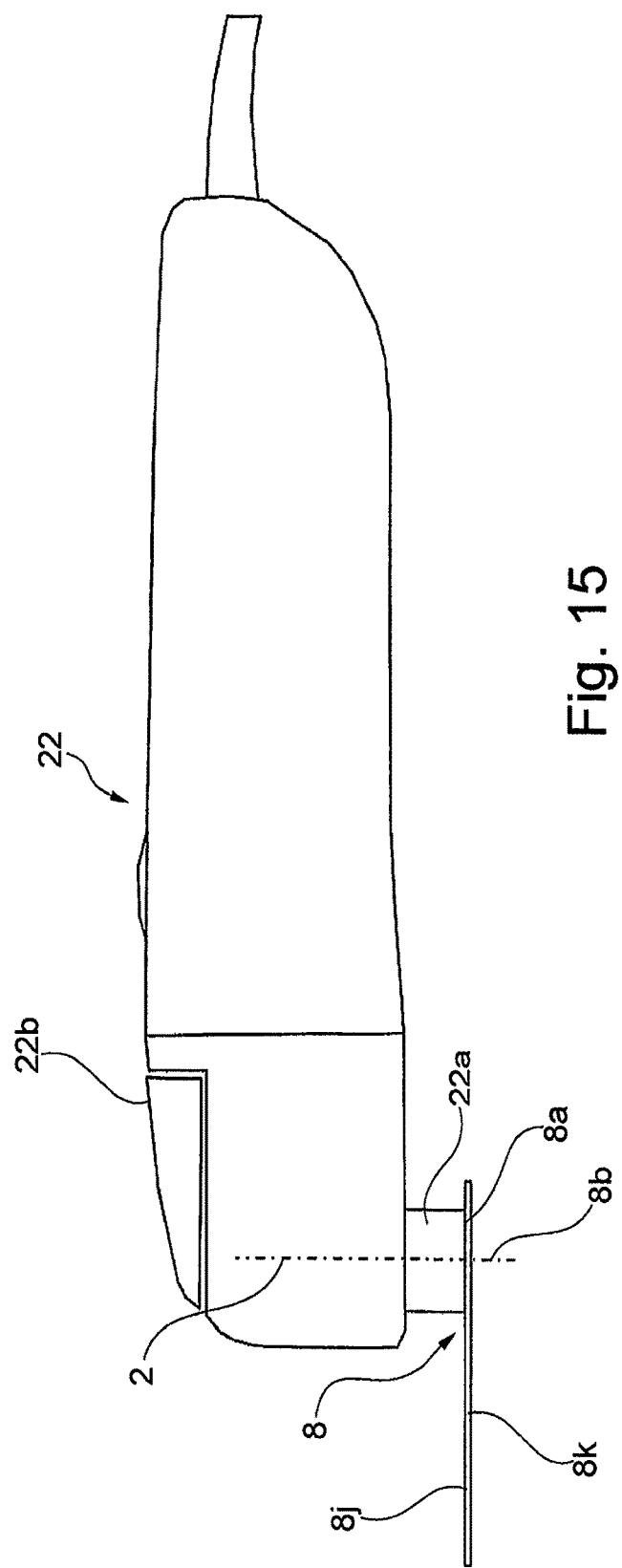
Figure 16:
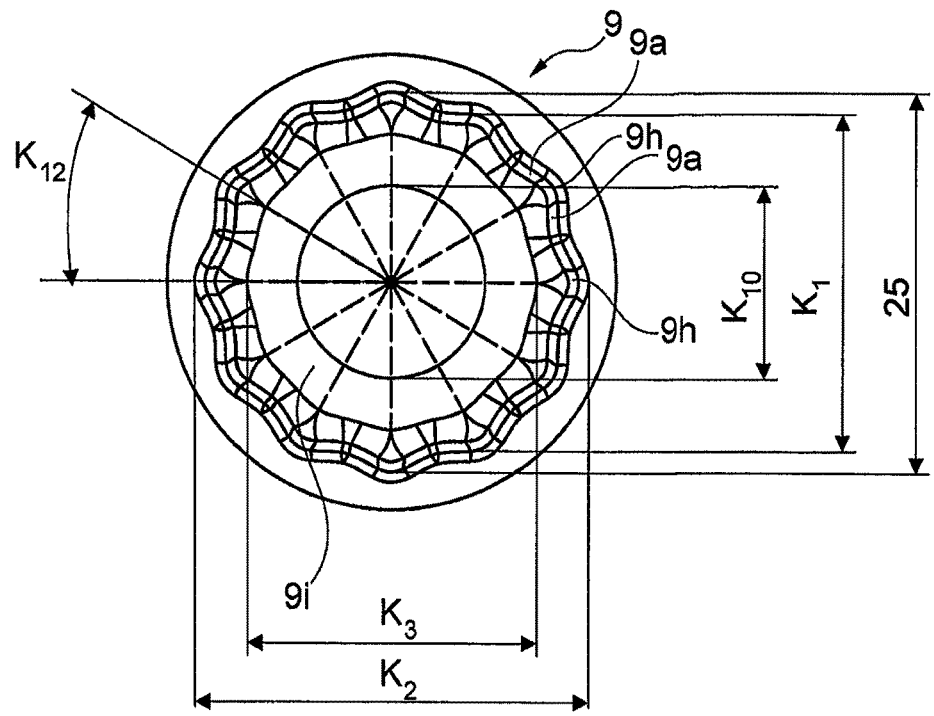
Figure 17:
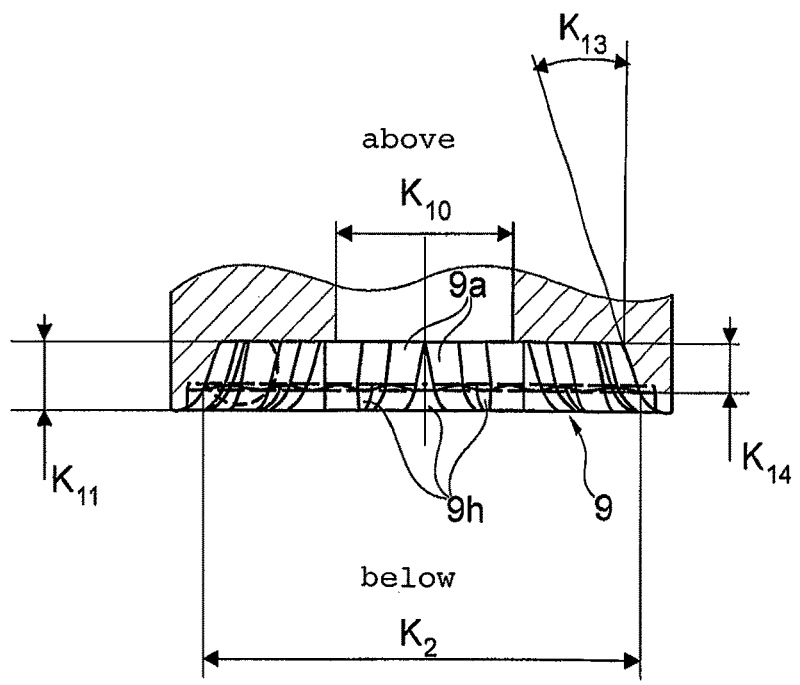

Here, the following is showed:

FIG. 1 shows a side view (FIG. 1a) and a plan view (FIG. 1 b) of a torque transmission region with two output surface regions, FIG. 2 shows a side view of a torque transmission region with output area regions, which extend between boundary planes, FIG. 3 shows a plan view (FIG. 3a) and a side view (FIG. 3b) of a torque transmission region with the two output surface areas, which are disposed abutting one another, FIG. 4 shows a plan view (FIG. 4a) and a side view (FIG. 4b) of a section of a torque transmission region and the inclination of an output surface area to the angle β, FIG. 5 shows a sectional view of a torque transmission region and the inclination of a drive surface area at the angle a, FIG. 6 shows a perspective view of a torque transmission region with a star-shaped arrangement of the output surface areas around the output shaft, FIG. 7 shows a plan view (FIG. 7a) and a side view (FIG. 7b) of a torque transmission region with a star-shaped arrangement of the output surface areas, FIG. 8 shows two sectional views of torque transmission regions with different encoding devices, FIG. 9 shows a sectional view of a machine tool system, FIG. 10 shows a plan view of the profile of the side wall of the tool device which has the tool drive surface regions, FIG. 11 shows perspective views of contact areas (FIG. 11 a, point contact; FIG. 11b, line contact; FIG. 11c, surface contact) between the output surface areas and the tool drive surface regions, FIG. 12 shows perspective views of differently curved output surface areas, FIG. 13 shows a sectional view of a tool device which is held on the machine tool by means of a screw device, FIG. 14 shows a sectional view of a tool device which is held on the machine tool by means of a tie bar device and a nut member, FIG. 15 shows side view of a machine tool with a tool device, FIG. 16 shows a plan view (from below) of an embodiment of the torque transmission region of the machine tool, FIG. 17 shows a sectional view of one embodiment of torque transmission region of the machine tool.

The FIG. 1 shows two views of a torque transmission region 9 of a tool receiving device (FIG. 1a a front view, FIG. 1b a plan view). This torque transmission region 9 has two output area regions 9a, on each of which a plurality of surface points 9b are shown. The torque transmission region 9 is adapted to transmit the driving forces of the machine tool to a tool device (not shown). The machine tool drives the tool device in a rotating oscillating manner, thereby the tool device oscillates around the output shaft 2, which substantially coincides with the tool axis of rotation. The output shaft 2 is a fictional, geometrical axis.

The FIG. 2 shows a torque transmission region 9 of a machine tool, this is adapted to transmit the driving forces from the machine tool to the tool device (not shown). The torque transmission region 9 has two output area regions 9a. On each output area region 9a several area points 9b are shown. The output area regions 9a each extend between an upper boundary plane 13 and a lower boundary plane 14, wherein the upper boundary planes coincide in one boundary plane 13. The boundary planes 13/14 are arranged perpendicular to the output shaft 2. By means of the machine tool, the tool device (not shown) is rotationally driven oscillating around the output shaft 2.

The FIG. 3 shows two views of a torque transmission region 9 of a machine tool (FIG. 3a plan view, FIG. 3b front view). The torque transmission region 9 is provided for transmitting the driving forces from a machine tool to a tool device (not shown), the tool device is driven in rotationally oscillating manner around the output shaft 2. In each case, two output area regions 9a are positioned abutting against each other, and several of these output area regions 9a are arranged rotationally symmetrical around the output shaft 2. The output shaft 2 is a fictional, geometrical axis. The output area regions 9a extend between a single upper boundary plane 13 and a single lower boundary plane 14. In each case, two output area regions 9a are connected to two further output area regions 9a by means of a connecting region 9c. By the abutting arrangement of the output area regions 9a, these can support each other, and a particularly stable torque transmission region 9 is enabled. Due to the rotationally symmetric arrangement of the output area regions 9a, it is possible to offset the tool device in discrete steps around the output shaft, thus a more flexible use of the machine tool is possible.

The FIG. 4 shows two views of a section of torque transmission region 9 of the machine tool (FIG. 4a plan view, FIG. 4b front view). An axial plane 15 includes the output shaft 2. A tangent plane 17 is tangent to the output area region 9a in a surface point 9b. The tangent plane 17 includes the acute angle β with the axial plane 15.

The FIG. 5 shows a sectional view of a torque transmission region 9 of a machine tool. The torque transmission region 9 has a plurality of output area regions 9a. A tangent plane 17 is tangent to one of these output area regions 9a in a surface point 9b. A radial plane 16 is arranged orthogonal to the output shaft 2. The radial plane 16 includes the acute angle α with the tangent plane 17.

The FIG. 6 shows a tool receiving device 1 in a three-dimensional illustration. The torque transmission region 9 has a plurality of output area regions 9a. These output area regions 9a are arranged rotationally symmetrical in a star-shaped manner around the output shaft 2. A tool device (not shown) can be held at the machine tool by the hook device 4a/b. The output area regions 9a are arranged in such a way that a surface normal 18 to one of these output area regions 9a faces in the direction to the output shaft 2. It follows that the torque transmission region 9 is designed primarily as a recess with a star-shaped profile. The output area regions 9a are arranged contiguously and they extend radially closed around the output shaft 2. By this arrangement, a particularly stable torque transmission region 9 is made possible, which allows a uniform application from the driving forces of the machine tool to the tool device (not shown).

The FIG. 7 shows a torque transmission region 9 of a tool receiving device of a hand guided machine tool, wherein the FIG. 7a shows a plan view of the tool receiving device and the FIG. 7b shows a front view of the tool receiving device. A tool device (not shown) can be hold at a torque transmission region 9 by means of the hook device 4a/b. For this purpose, the hook device 4a/b can be moved in opposite directions. The torque transmission region 9 has a plurality of output surface areas 9a, these are arranged radially closed circumferential to the output shaft 2 and they are arranged star-shaped. A surface normal 18 on one of these output area regions 9a is oriented away from the output shaft 2. By such an arrangement of the output area regions 9a, a particularly simple tool receiving device can be achieved.

The FIG. 8 shows two partial sectional views of the torque transmission regions 9 of a tool receiving device of a hand guided machine tool, wherein in this figure different encoding device 19 are shown. The FIG. 8a shows a torque transmission region 9 with a plurality of output area regions 9a. The output area regions 9a are arranged in a star-shaped manner around the output shaft 2 and they are radially spaced therefrom. In the area of the output shaft 2, a encoding device 19a is arranged as a raised portion, while this encoding device 19a is adapted to engage into a recess in the tool device (not shown). The encoding device 19a is arranged circular and rotationally symmetric to the output shaft 2. The FIG. 8b shows a torque transmission region 9 with a plurality of output area regions 9a. The output area regions 9a are arranged in a star-shaped manner around the output shaft 2 and radially spaced to it. In the area of the output shaft 2, an encoding device 19b is arranged as a recess, thereby this encoding device 19b is adapted that a raised portion of a tool device (not shown) engages in it.

The FIG. 9 shows a machine tool system or a processing system comprising a tool receiving device 1 and a tool device 8. The tool device 8 is accommodated in the tool receiving device 1 in such a manner that the output shaft 2 and the fictive, geometric tool axis of rotation 8b are coincident. The tool device 8 has a tool attachment region 8a, which extends between a first orthogonal plane 8c and a second orthogonal plane 8d. The tool driving area region 8f is disposed between the first orthogonal plane 8c and the second orthogonal plane 8d. The first orthogonal plane 8c limits the tool attachment region 8a on the machine tool side facing in the direction of the tool axis of rotation 8b, the second orthogonal plane 8d limits the tool attachment region 8a on the side facing away from the machine tool side. The tool driving region 8f is provided for the transmission of the driving forces from the machine tool to the tool device 8 and it extends in the axial direction in the region 8g. For this purpose, the tool driving region 8f comprises at least in sections, the negative form of the output area region 9a, thus enabling a form fit connection between the tool device 8 and the tool receiving device 1. The tool device 8 has a tool encoding device 8e, wherein the first hook device 4a and the second hook device 4b of the holding device 4 grip through it. The hook devices 4a/b apply in the region of the operating area 4c a holding force effect 4h on the tool device 8. The tool device 8 is held by the holding force effects 4h on the machine tool. By the double inclination around the angle α and the angle β (not shown) of the output area regions 9a of the torque transmission region 9, the tool device 8 is held free from backlash in the tool receiving device 1. The holding force effects 4h are applied indirectly by the clamping device 3 The hook devices 4a/b of the holding device 4 are mounted rotatably around the hook pivot point 4d. The clamping device 3 contacts by means of the moving member 6 the holding device 4. By the design of the guiding recess 5e, the sum of the holding force effects 4h is enlarged in regard to the clamping force 3a, and it allows a particularly secure holding of the tool device 8 in the tool receiving device 1.

The FIG. 10 shows the progression of the tool side wall 8i, which has the tool driving area regions 8f. The tool driving area regions 8f are arranged in a star-shaped manner around the tool axis of rotation 8b, and they are partly conjugated to the output area regions 9a of the torque transmission region (not shown). The tool side wall 8i extends in the region of the tool driving area regions 8f between a first distance r1 and second distance r2 to the tool axis of rotation 8b. The tool driving area regions 8f have it selves tool surface points 8h. Due to the progression of the tool driving area regions 8f, which has been adapted to the output area regions 9a of the torque transmission area (not shown), a form fit transmission of the driving forces from the machine tool to the tool device 8 is made possible allowing that very large driving forces are transmitted securely.

The FIG. 11 shows various contact regions 20a, 20b, 20c between the tool driving area regions 8f and the output area regions 9a of the torque transmission region 9. Here, the form and the type of the shape of the two driving/output surface regions 8f/9a and their interaction depends on these contact regions 20a, 20b, 20c. The FIG. 11a shows a point shaped contact region 20a, wherein this contact region 20a has a circular extension or an elliptical extension. A point shaped contact area 20a is particularly insensitive to an inaccurate positioning of the tool device in regard to the machine tool, as this can be caused by tolerances in the manufacture of the tool device. The FIG. 11b shows a line shaped contact region 20b, wherein this contact region 20b has a large extension along the line of contact 21, and transverse to this it has a small extension. A line shaped contact region 20b provides a larger contact area compared to the point shaped contact region 20a, and larger driving forces can be transmitted from the machine tool to the tool device. The FIG. 11c shows an area shaped contact region 20c. The area shaped contact region 20c provides a larger contact area compared to a line shaped contact region 20b, and therefore, larger driving forces can be transmitted from the machine tool to the tool device. Compared to a point shaped contact 20a region, a line shaped contact region 20b and an area shaped contact region 20c require a higher accuracy, both in the production of the tool driving area region 8f and in the production of the output area region 9a as well as in the positioning of the tool device on the machine tool. The output area region 9a and tool driving area region 8f can be coordinated in such a manner that an area contact (FIG. 11c) or a linear contact (FIG. 11b) is made only upon the transmission of substantial driving forces, for example during the operation of the machine tool with the rated power.

The FIG. 12 shows different sections of an output area region 9a. Not shown is a planar output area region, such an output area region is a further preferred embodiment. The FIG. 12a shows an unidirectionally curved section of an output area region 9a. This section of the output area region 9a can be described by means of straight lines a and curved grid gridlines $b_I$. The curved grid lines $b_I$ have a constant radius of curvature $R_I$. Such an output area region 9a corresponds in sections to a cylinder jacket surface. As far as several different radii of curvature $R_I$ are provided, it corresponds to a conical surface (not shown). In this case, the size of the radius of curvature $R_I$ can be chosen in such a way that the output area region 9a changes in the transmission of the driving forces in sections to a plane, or that it adapts to the opposite surface (not shown), so that the tool driving area region 8f cooperates with which these for the transmission of the driving forces. The FIG. 12B shows a section of an output area region 9a with a bidirectional curvature. This section of the output area region 9a can be described by the curved grid lines $b_I$ and by the curved grid lines $b_{II}$. The grid lines $b_I$ have a constant radius of curvature $R_I$ and the grid lines $b_{II}$ have a constant radius of curvature $R_{II}$. For the special case that the first radius of curvature $R_I$ and the second radius of curvature $R_{II}$ are the same size, such an output area region 9a corresponds to a spherical surface. The FIG. 12b shows an output area region 9a with different radii of curvature $R_I$ and $R_{II}$. In this case, the size of the radii of curvature $R_I$ and $R_{II}$ can be chosen such that the output area region 9a changes, at least partially, during the transmission of the driving forces into a plane, or that it adapts to the tool driving area region 8f (not shown), with which it cooperates for the transmission of the driving forces. The FIG. 12c shows a section of the output area region 9a with a bidirectional curvature. This section of the output area region 9a can be described by the grid lines $b_I$ having a constant radius of curvature $R_I$ and by the grid lines $b_{Ia}$ having a variable radius of curvature $R_{Ia}$. In such an output surface portion 9a, also all grid lines can have a variable radius of curvature (not shown). The size of the radii of curvature $R_{Ia}$ and $R_{II}$ can be selected so that the output area 9a changes in the transmission of driving forces in sections to a plane, or that it adapts to the tool driving area region 8f (not shown), with which it cooperates for the transmission of the driving forces. In the FIG. 12, concave curved output area region 9a are shown, the above mentioned considerations can be transferred to the convex curved output area regions, accordingly. Advantageously, a concave to convex pairing of the tool driving area region 8f and the output area region 9a is chosen, or convex to concave, respectively, since in this way large driving forces can be transmitted, or a convex to convex pairing or flat to convex pairing is chosen, because in this way a simple positioning of the tool device can be achieved.

The FIG. 13 shows a tool device 8, which is fixed to the machine tool (not shown) by means of a screw device (fixing screw 9d, washer 9e, nut member 9o. The tool device 8 has an operating region 8j to act on a workpiece or on a workpiece arrangement. The driving forces are transmitted from the tool driving area region 8f to this operating region 8j by means of the tool connection region 8k. The tool device 8 is held on the machine tool by means of the fixing screw 9d, wherein it applies its force action on the tool device 8 by the washer. The transmission of the driving forces from the machine tool to the tool device 8 is achieved substantially by the form fit engagement of the torque transmission region 9 and the tool driving area region 8f. The tool device 8 is held in such a way on the machine tool that the tool axis of rotation 8b and the output shaft 2 substantially coincide. The tool device 8 is rotationally driven to oscillate around the output shaft 2.

The FIG. 14 shows a tool device 8, which is fixed on the machine tool (not shown) by a further screw device (tie bar device 9g, washer 9e, nut member 9o. The tool means 8 has an operating region 8j to act on a workpiece or on a workpiece arrangement. From the tool driving area, 8f the driving forces are transmitted to this operating region 8j by means of the tool connection region 8k. In this case, the tool device 8 is held on the machine tool by the nut member 9f and the tie bar device 9g, which apply their force action on the tool device 8 by the washer 9e. The transmission of the driving forces of the machine tool on the tool device 8 is achieved substantially by the form fit engagement of the torque transmission region 9 and the tool driving area region 8f. The tool device 8 is held in such a way on the machine tool that the tool axis of rotation 8b and the output shaft 2 substantially coincide. The tool device 8 is rotationally oscillating driven around the output shaft 2.

The FIG. 15 shows a machine tool system comprising a tool device 8, which is received in a machine tool 22. The tool device 8 has a tool attachment region 8a, by which it is connected to the machine tool 22. The machine tool 22 has an output spindle 22a, which guides the driving forces to the tool device 8, and in particular to the tool connecting region 8a. The output spindle 22a moves around the output shaft 2, in particular rotationally oscillating, thereby the tool device 8 is also set in a similar motion. The tool device 8 has an operating region 8j, which is adapted to act on a workpiece or on a workpiece arrangement (not shown). The driving forces of the machine tool 22 are transmitted from the tool attachment region 8a to the operating region 8j by the tool connection region 8k. The machine tool 22 has an operating lever 22b, which is adapted to enable a change of the tool device 8.

The FIG. 16 and the FIG. 17 show a torque transmission region 9 of a machine tool in different views. The FIG. 16 shows a view from below and the FIG. 17 shows a sectional view of the side view of the torque transmission region 9. In this case, a view from below should be understood in that it is seen to the torque transmission region 9 from the direction from which the tool device is inserted into the machine tool. The torque transmission region 9 of the machine tool is illustrated in the FIG. 16 and in the FIG. 17 as a star-shaped polygon with rounded corners, while the below mentioned relationships can also be applied, at least mutatis mutandis, to other forms of such a torque transmission region 9.

In the bottom view, the FIG. 16, the rounded corners (transition regions 9h) of the polygon can be seen. A so-called arm of the polygon is formed by two output area regions 9a and a transition region 9h. Here, such a transition region 9h should be preferably understood as a rounding having a variable radius or a constant radius. Further preferably, such a transition region 9h abuts tangentially to one of the or to both of the output area regions 9a. Further preferably, the variable or the constant radius of such a transition region 9h is selected from a range between 0.25 mm and 10 mm, preferably it is selected from a range between 1 mm and 5 mm, and more preferably it is selected from a range between 2.5 mm and 4 mm. The individual arms of the polygon are offset to each other by an equidistant angle k12. Preferably, here this, preferably equidistant, angle k12 results from the relationship: Full circle/(number of arms)=k12; for the present case 360 degrees/12=30 degrees. Preferably, by the equidistant angular k12, it is possible to accommodate the tool device (not shown) in different rotational positions in this torque transmission region 9, and thus to accommodate it in the machine tool. In the present case, the tool device can be offset against the torque transmission region 9 in discrete steps of 30 degrees.

The torque transmission region 9 has a machine tool cover surface section 9i. In this machine tool cover surface section is arranged a, preferably circular, recess having a diameter k10. This recess having the diameter k10 is adapted to receive a connecting device (not shown) and to cooperate with it, respectively. By means of the connection device, the tool device (not shown) is held on the machine tool. Further preferably, forms differing from the circular shape are also possible for this recess. Preferably, this recess (not shown) is constructed as a sort of a through recess or a blind hole recess with or without a threaded portion, or as a passageway for the holding device (not shown).

The diameters of k2 and k3 describe the inner diameters of the torque transmission region. In a preferred embodiment, the inner diameter k2 is preferably selected from a range between 30 mm and 36 mm, preferably it is selected from a range between 32 mm to 34 mm, and more preferably the inner diameter k2 is substantially 33.35 mm (+/−0.1 mm).

In a preferred embodiment, the inner diameter k3 is preferably selected from a range between 22 mm and 27 mm, preferably it is selected from a range between 24 mm to 26 mm, and more preferably the inner diameter k3 is substantially 25 mm (+/−0.1 mm).

The distance k1 defines the distance of the two output area regions 9a, which are parallel to each other in this view (in a spatial view, the output area regions 9a are still inclined to each another). Compared with a screw head (for example, an hexagonal bar), the distance k1 corresponds to a key length.

In a preferred embodiment, this key length k1 is preferably selected from a range between 26 mm and 30 mm, preferably it is selected from a range between 27 mm and 29 mm, and more preferably, the key length is substantially 28.4 mm (+/−0.1 mm).

The diameter of 25 indicates a reference diameter for the torque transmission region 9 of the machine tool. In a preferred embodiment, the reference diameter 25 is preferably selected from a range between 31 mm and 33 mm, preferably it is selected from a range between 31, 5 mm and 32.5 mm, and more preferably the reference diameter 25 is substantially 32 mm (+/−0.1 mm). In this case, the reference diameter 25 should be construed further preferably as a nominal dimension of the torque transmission region 9 and be defined in the direction of the output shaft in a certain height.

In the sectional view, the FIG. 17, the cross-sectional area of the torque transmission region 9 can be seen particularly well. In this case, the torque transmission region 9 is designed primarily as a blind hole. Said recess is tapered in the direction of the output shaft 2 in the upward direction and is has substantially the shape of a truncated cone. The cross-sectional surface of this truncated cone has preferably the form, which is illustrated in the FIG. 16, of a polygon with rounded corners, wherein said cross-sectional area are arranged orthogonal to the output shaft 2.

It has been found that particularly long lifetimes can be achieved for these torque transmission region 9 as well as for this tool device 1, which is accommodated into it, if certain transitions are rounded, in particular those to the output area regions 9a or between them. Such a rounding should be understood in that the transition to the output area regions has a constant radius or a variable radius.

Further preferably, the variable radius or the constant radius of such a region as well as of the transition region 9h is selected from a range between 0.25 mm and 10 mm, preferably it is selected between 1 mm and 5 mm, and more preferably it is selected between 2.5 mm and 4 mm.

The output area regions 9a are inclined in the illustration of the FIG. 17 by the angle k13 in regard to an imaginary vertical line (parallel to the output shaft 2). In a preferred embodiment, this angle is selected from a range between 10 degrees and 30 degrees, preferably it is selected from a range between 17.5 degrees and 22.5 degrees, and more preferably the angle is substantially 20 degrees k13 (+/−0.5 degrees).

The diameter k2 preferably indicates the area of the torque transmission region 9, from which the output surface areas 9a (from below in the direction of the output shaft 2) extend substantially in a straight line. After this straight line progression, the output surface areas 9a proceed, preferably into the radius k9 and then into the machine tool cover surface section 9i.

In a preferred embodiment, the output surface areas 9 extend at a height (a direction parallel to the output shaft 2) at least for the measure k14 substantially in a straight line. A straight line according to the invention should be understood in that it has no significant curvature, preferably in an unloaded state, further preferably also in a loaded state. Preferably, the measure k14 is selected from a range between 1, 5 mm and 10 mm, preferably it is selected from a range between 2 mm and 6 mm, more preferably the measure k14 is substantially 4 mm (+/−0.5 mm). Preferably, the measure k14 should be understood as the shortest linear course to the output area regions 2.

In a preferred embodiment, the torque transmission region 9 comprises a depth k11, preferably the depth is k11 is selected from a range between 3.5 mm and 10 mm, more preferably it is selected from a range between 4.5 mm and 8 mm, and most preferably the depth k11 is substantially 6.5 mm (+/−1 mm).

LIST OF REFERENCE SIGNS 1 tool receiving device of a hand guided machine tool
2 output shaft
3 clamping device
3a clamping force
4 holding device
4a first hook means 4b second hook means
4c holding area
4d hook rotation point
4g holding device boundary area
4h holding force effect
5e guiding recess
6 moving member
8 tool device
8a tool attachment region
8b tool axis of rotation
8c first orthogonal plane
8d second orthogonal plane
8e tool encoding device
8f tool driving area region
8g axial extension of the tool driving surface area
8h tool surface point
8i tool side wall
8j operating region
8k tool connection region
9 torque transmission region
9a output area region
9b surface point
9c connecting region
9d fastening screw
9e washer
9f nut member
9g tie bar device
9h transition region (arranged between the two output area regions)
9i machine tool cover surface section
13 upper boundary plane
14 lower boundary plane
15 axial plane
16 radial plane
17 tangent plane
18 surface normal to an output area region
19 encoding device
19a elevated encoding device
19b encoding device with a recess
20a point shaped contact region
20b line shaped contact region
20c area shaped contact region
21 line of contact between the tool driving area region and the output area region
22 machine tool
22a output spindle
22b operating lever
25 reference diameter for the torque transmission region
α first angle
β second angle
$r_1$ first distance of the tool side wall to the tool axis of rotation
$r_2$ second distance of the tool side wall to the tool axis of rotation
$R_I$ first radius of curvature of a surface area output
$R_{Ia}$ variable radius of curvature of an output area region
$R_{II}$ second radius of curvature of an output area region
a straight extending grid line of an output area region
$b_I$ first curved grid line of an output surface area
$b_{II}$ second curved grid line of an output surface area
$b_{Ia}$ third grid line with a variable curvature of an output surface area
k1 key length, distance of parallel output surface areas
k2 first inner diameter
k3 second inner diameter
k10 diameter of the recess in the machine tool cover surface section
k11 depth of the torque transmission region
k12 polygon angle
k13 angle between the output area region and the parallel to the output shaft
k14 linear progression curve of the output area region

What is claimed is:

1. A rotary oscillating tool comprising:
an axial output shaft capable of rotary oscillation around a first axis;
a torque transmission unit in fixed communication with the axial output shaft and having first and second connection portions;
the first connection portion adapted to hold a tool device in such a manner that the first axis and an axis of rotation of the tool device are substantially coincident;
the second connection portion including a wall, the wall comprising at least two surface portions which are spaced from the first axis and which face towards the first axis and which are arranged to transmit torque to the tool device when the tool device is held by the first connection portion; and
each of the at least two surface portions having a plurality of surface points, each of the surface points having a respective tangent plane associated therewith, wherein the tangent planes associated with at least one surface point of each of said at least two surface portions is inclined relative to an axial plane and relative to a radial plane, wherein said axial plane is a plane that includes said first axis, and said radial plane is a plane that is perpendicular to said first axis.

2. The tool according to claim 1, wherein the wall is at least partially concave in an area where at least a pair of adjacent surface portions meet.

3. The tool according to claim 1, wherein the second connection portion has at least a first, upper boundary plane spaced apart from at least a second, lower boundary plane, wherein these boundary planes are disposed substantially perpendicular to the output shaft axis.

4. The tool according to claim 1, wherein the second connection portion includes a plurality of output area regions which are arranged rotationally symmetrical around the output shaft axis.

5. The tool according to claim 1, wherein the surface portions are arranged symmetrical to a plane of symmetry and are substantially contiguous and the output shaft axis is located in this plane of symmetry.

6. The tool according to claim 1, wherein the wall extends over an angle of 360 degrees substantially without interruption around the output shaft axis.

7. The tool according to claim 1, wherein between one of these tangent planes and said axial plane the angle β is included, wherein the angle β is selected from the group consisting of: less than 90 degrees, less than 70 degrees, less than 65 degrees, larger than 0 degrees, larger than 15 degrees, larger than 30 degrees, and substantially 30 degrees, 45 degrees or 60 degrees.

8. The tool according to claim 1, wherein between one of these tangent planes and said radial plane the angle α is enclosed, wherein the angle α is selected from the group consisting of: less than 90 degrees, less than 80 degrees, less than 75 degrees, larger than 0 degrees, larger than 45 degrees, larger than 60 degrees, and in a range from 62.5 degrees to 72.5 degrees.

9. The tool according to claim 1, wherein the second connection portion includes less than 32 surface portions.

10. The tool according to claim 1, wherein the surface portions are arranged in the form of a star-shaped polygon.

11. The tool according to claim 10, wherein a number of corners of said star-shaped polygon is selected from the group consisting of: 4, 6, 8, 10, 12, 14, 16, 18 and 20.

12. The tool according to claim 1, further including an encoding device that comprises at least a first cross-sectional area and which has a first extent in a direction substantially perpendicular to the cross-sectional area.

13. The tool according to claim 1, wherein the first connection portion comprises at least one of:
a screw,
a tie bean,
a hook,
a clip,
a ratchet,
a bayonet closure,
locking projections, and/or
a ball and block.

14. A tool device for use with a rotary oscillating tool comprising:
a torque acceptance member having first and second connection portions and having a first axis of rotation;
the first connection portion adapted to receive a clamp portion of the rotary oscillating tool;
the second connection portion including a wall, the wall comprising at least two surface portions which are spaced from the first axis and which face away from the first axis and which are arranged to receive torque to be transferred by the rotary oscillating tool when the tool device is held by the clamp portion; and
each of the at least two surface portions having a plurality of surface points, each of the surface points having a respective tangent plane associated therewith, wherein the tangent planes associated with at least one surface point of each of said at least two surface portions is inclined relative to an axial plane and relative to a radial plane, wherein said axial plane is a plane that includes said first axis, and said radial plane is a plane that is perpendicular to said first axis.

15. The tool device according to claim 14, wherein the wall is at least partially convex in an area where at least a pair of adjacent surface portions meet.

16. The tool device according to claim 14, wherein the second connection portion includes a plurality of torque receiving area regions which are arranged rotationally symmetrical around the output shaft axis.

17. The tool according to claim 14, wherein the wall extends over an angle of 360 degrees substantially without interruption around the first axis.

18. The tool according to claim 14, wherein the surface portions are arranged in the form of a star-shaped polygon.

19. The tool according to claim 18, wherein a number of corners of said star-shaped polygon is selected from the group consisting of: 4, 6, 8, 10, 12, 14, 16, 18 and 20.

20. The tool device of claim 14, wherein the tool is a saw.

21. A rotary oscillating tool and tool device comprising:
an axial output shaft capable of rotary oscillation around a first axis;
a torque transmission unit in fixed communication with the axial output shaft and having first and second connection portions;
the first connection portion is adapted to hold the tool device in such a manner that the first axis and an axis of rotation of the tool device are substantially coincident;
the second connection portion including a wall, the wall comprising at least two surface portions which are spaced from the first axis and which face towards the first axis and which are arranged to transmit torque to the tool device when the tool device is held by the first connection portion;
each of the at least two surface portions having a plurality of surface points, each of the surface points having a respective tangent plane associated therewith, wherein the tangent planes associated with at least one surface point of each of said at least two surface portions is inclined relative to an axial plane and relative to a radial plane, wherein said axial plane is a plane that includes said first axis, and said radial plane is a plane that is perpendicular to said first axis; and
wherein the tool device includes a torque acceptance member having first and second connection portions adapted to removably and substantially mate with the first and second connection portions of the torque transmission unit.

22. The tool device according to claim 21, further comprising:
an operating area, which is adapted to act on a work piece or on an arrangement of work pieces, and
a tool connection region, which is adapted to transmit torque from the torque acceptance member to the operating area.

23. The tool according to claim 21, wherein the wall forms a substantially hollow conical recess in the region of the torque transmission unit, wherein the recess has a cross-section with a variable spacing of the wall to the output shaft axis in a plane which is orthogonal to the output shaft axis.

24. The tool according to claim 21, wherein the torque transmission unit is formed substantially as a blind hole.

* * * * *